United States Patent
Tatsuta

(10) Patent No.: US 12,248,134 B2
(45) Date of Patent: Mar. 11, 2025

(54) MICROSCOPE SYSTEM, FOCUS ADJUSTMENT PROGRAM, AND FOCUS ADJUSTMENT SYSTEM

(71) Applicant: Sony Group Corporation, Tokyo (JP)

(72) Inventor: Hirokazu Tatsuta, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 852 days.

(21) Appl. No.: 17/431,122

(22) PCT Filed: Feb. 20, 2020

(86) PCT No.: PCT/JP2020/006837
§ 371 (c)(1),
(2) Date: Aug. 13, 2021

(87) PCT Pub. No.: WO2020/171173
PCT Pub. Date: Aug. 27, 2020

(65) Prior Publication Data
US 2022/0146805 A1 May 12, 2022

(30) Foreign Application Priority Data
Feb. 20, 2019 (JP) .................... 2019-028737

(51) Int. Cl.
*G02B 21/24* (2006.01)
*G01N 21/64* (2006.01)
(Continued)

(52) U.S. Cl.
CPC ....... *G02B 21/244* (2013.01); *G01N 21/6458* (2013.01); *G02B 21/08* (2013.01);
(Continued)

(58) Field of Classification Search
None
See application file for complete search history.

(56) References Cited

U.S. PATENT DOCUMENTS

| 2006/0157637 A1* | 7/2006 | Karasawa | G02B 21/16 250/201.7 |
| 2011/0009744 A1* | 1/2011 | Muraki | G01N 21/6456 600/431 |
| 2021/0041659 A1* | 2/2021 | Yasui | G03B 13/36 |

FOREIGN PATENT DOCUMENTS

| CN | 102354046 A | 2/2012 |
| JP | H10-047918 A | 2/1998 |

(Continued)

OTHER PUBLICATIONS

International Written Opinion and English translation thereof mailed Apr. 7, 2020 in connection with International Application No. PCT/JP2020/006837.

(Continued)

*Primary Examiner* — Derek S. Chapel
(74) *Attorney, Agent, or Firm* — Wolf, Greenfield & Sacks, P.C.

(57) ABSTRACT

An irradiation unit (14) projects excitation light (LB) having an asymmetric shape with respect to an optical axis (A1, A2). An objective lens (20) concentrates the excitation light (LB) at a measurement-target member (22) including a glass member (22C, 22A) and a measurement-target region (22B). The detection unit (30) includes at least one or more light-receiving units (31) that receive fluorescence emitted from the measurement-target region (22B) in response to the excitation light (LB), and outputs a fluorescence signal indicating intensity values of fluorescence received by the respective light-receiving units (31). The movement control unit (12C) includes a derivation unit (12B) that derives a movement amount and a movement direction of at least one of the objective lens (20) or the measurement-target member (22) on the basis of the fluorescence signal, and moves at least one of the objective lens (20) or the measurement- (Continued)

target member (22) by the derived movement amount in the derived movement direction.

12 Claims, 23 Drawing Sheets

(51) Int. Cl.
    *G02B 21/08*     (2006.01)
    *G02B 21/16*     (2006.01)
    *G02B 27/30*     (2006.01)

(52) U.S. Cl.
    CPC .............. *G02B 21/16* (2013.01); *G02B 27/30* (2013.01); *G01N 2021/6463* (2013.01)

(56) References Cited

FOREIGN PATENT DOCUMENTS

| | | |
|---|---|---|
| JP | 2008-152011 A | 7/2008 |
| JP | 2009-098437 A | 5/2009 |
| JP | 2011-175289 A | 9/2011 |
| JP | 2015-227940 A | 12/2015 |

OTHER PUBLICATIONS

International Preliminary Report on Patentability and English translation thereof mailed Sep. 2, 2021 in connection with International Application No. PCT/JP2020/006837.

International Search Report and English translation thereof mailed Apr. 7, 2020 in connection with International Application No. PCT/JP2020/006837.

\* cited by examiner

MICROSCOPE SYSTEM, FOCUS ADJUSTMENT PROGRAM, AND FOCUS ADJUSTMENT SYSTEM

CROSS-REFERENCE TO RELATED APPLICATIONS

This application claims the benefit under 35 U.S.C. § 371 as a U.S. National Stage Entry of International Application No. PCT/JP2020/006837, filed in the Japanese Patent Office as a Receiving Office on Feb. 20, 2020, which claims priority to Japanese Patent Application Number JP2019-028737, filed in the Japanese Patent Office on Feb. 20, 2019.

TECHNICAL FIELD

The present disclosure relates to a microscope system, a focus adjustment program, and a focus adjustment system.

BACKGROUND ART

A technique has been disclosed in which light having an asymmetric shape with respect to an optical axis is concentrated at a sample to detect a change in the interval between a condenser lens and the sample as a displacement in the light-receiving position of reflected light (see Patent Document 1, for example). Furthermore, a technique has been disclosed to adjust the focus of the condenser lens by using the amount of displacement of this light-receiving position to easily focus on the sample.

CITATION LIST

Patent Document

Patent Document 1: Japanese Patent Application Laid-Open No. H10-47918

SUMMARY OF THE INVENTION

Problems to be Solved by the Invention

Here, in measurement of a sample such as cells, the sample sandwiched by glass plates may be used. In this case, light reflected from the interface between air and a glass plate is dominant over light reflected from a measurement-target region in which the sample is present. Thus, conventionally, the focus is placed on the surface of the glass plate, and thus it has been difficult to easily focus on the measurement-target region arranged across the glass plate.

Thus, the present disclosure proposes a microscope system, a focus adjustment program, and a focus adjustment system that can easily focus on a measurement-target region arranged across a glass plate.

Solutions to Problems

To solve the above-mentioned problem, a microscope system in one form according to the present disclosure includes: an irradiation unit that projects excitation light having an asymmetric shape with respect to an optical axis; an objective lens that concentrates the excitation light at a measurement-target member including a glass member and a measurement-target region; a detection unit that: includes at least one or more light-receiving units that receive fluorescence emitted from the measurement-target region in response to the excitation light; and outputs a fluorescence signal indicating intensity values of fluorescence received by the respective light-receiving units; and a movement control unit that: includes a derivation unit that derives a movement amount and a movement direction of at least one of the objective lens or the measurement-target member on the basis of the fluorescence signal; and moves at least one of the objective lens or the measurement-target member by the derived movement amount in the derived movement direction.

MODE FOR CARRYING OUT THE INVENTION

Figure 1:
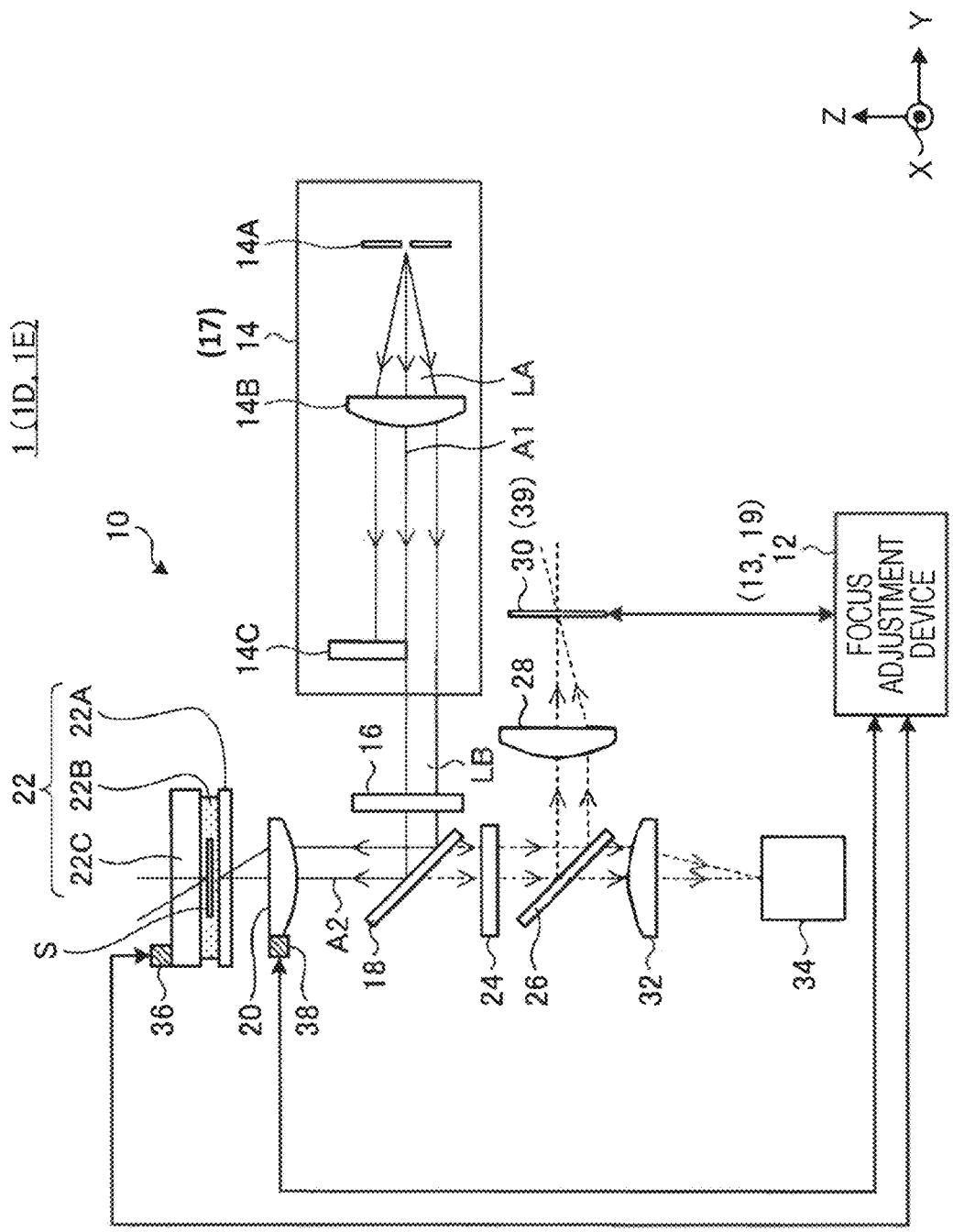
FIG. 1 is a schematic diagram showing an example of a microscope system according to a first embodiment of the present disclosure.

Embodiments of the present disclosure will be described in detail below on the basis of the drawings. Note that, in each of the following embodiments, the same reference numerals are given to the same portions, and overlapping descriptions will be omitted.

First Embodiment

FIG. 1 is a schematic diagram showing an example of a microscope system 1 of the present embodiment.

The microscope system 1 is a system that projects excitation light LB onto a sample S and receives fluorescence emitted from the sample S.

The microscope system 1 includes a measurement unit 10 and a focus adjustment device 12. The measurement unit 10 and the focus adjustment device 12 are connected in a manner capable of sending/receiving data or signals.

The measurement unit 10 has an optical mechanism for measuring fluorescence emitted from the sample S. The measurement unit 10 is applied to an optical microscope, for example.

The measurement unit 10 includes an irradiation unit 14, an excitation filter 16, a dichroic mirror 18, an objective lens 20, a measurement-target member 22, an emission filter 24, a half mirror 26, an imaging lens 28, a detection unit 30, an imaging lens 32, an image detecting unit 34, a first driving unit 36, and a second driving unit 38.

The irradiation unit 14 projects excitation light LB. The excitation light LB is light having an asymmetric shape with respect to an optical axis. The optical axis refers to optical axes (optical axis A1 and optical axis A2) from the irradiation unit 14 to the measurement-target member 22. An asymmetric shape with respect to an optical axis means that the shape of a light pencil in an orthogonal cross section orthogonal to the optical axis is asymmetric about the optical axis. Note that the wavelength range of the excitation light LB may be any wavelength range that includes a wavelength range in which the sample S emits fluorescence.

The irradiation unit 14 includes a light-emitting unit 14A, a collimating lens 14B, and a light-blocking unit 14C. The light-emitting unit 14A emits irradiation light LA.

The light-emitting unit 14A emits irradiation light LA that at least includes a wavelength range in which the sample S emits fluorescence. The light-emitting unit 14A may be any of a light source that emits spot-shaped (point-shaped) light, a light source that emits line-shaped light, a light source that emits line-shaped light through a slit or the like. Note that the spot and line shapes refer to shapes of the irradiation light LA projected from the light-emitting unit 14A in a cross section orthogonal to the optical axis A1. Furthermore, the optical axis A1 refers to the optical axis from the irradiation unit 14 to the dichroic mirror 18. In other words, the optical axis A1 refers to the optical axis of the collimating lens 14B.

In the description of the present embodiment, it is assumed that the light-emitting unit 14A is a light source that emits line-shaped irradiation light LA. Furthermore, in the description of the present embodiment, an example is used in which the longitudinal direction of the line-shaped irradiation light LA coincides with the X-axis direction in FIG. 1. The details of the X-axis direction will be described later.

The irradiation light LA projected from the light-emitting unit 14A reaches the light-blocking unit 14C after being converted to substantially collimated light by the collimating lens 14B. The light-blocking unit 14C partially blocks the irradiation light LA to be output as excitation light LB having an asymmetric shape with respect to the optical axis. The light-blocking unit 14C may be any member that partially blocks the irradiation light LA. The light-blocking unit 14C is a plate-shaped member that is non-transmissive to the irradiation light LA, for example.

Specifically, the light-blocking unit 14C blocks one end portion of the line-shaped irradiation light LA in a direction (Z-axis direction in the figure) crossing its longitudinal direction (X-axis direction). Note that the area of light blocked by the light-blocking unit 14C is not limited. For example, the light-blocking unit 14C may be arranged in any manner so as to block the area of the irradiation light LA from one end portion to the central portion in the Z-axis direction in a cross section orthogonal to the optical axis A1. The irradiation light LA is partially blocked by the light-blocking unit 14C to become excitation light LB having an asymmetric shape with respect to the optical axis A1.

The excitation filter 16 selectively transmits light in a wavelength range in which the sample S as a measurement target emits fluorescence. The excitation light LB is transmitted through the excitation filter 16 to have a narrower band, and then is reflected by the dichroic mirror 18 to reach the objective lens 20. Note that, in a case where a laser light source that emits irradiation light LA in a wavelength range in which the sample S emits fluorescence is used as the light-emitting unit 14A, the excitation filter 16 may not be provided. The dichroic mirror 18 reflects the excitation light LB and transmits light in other wavelength ranges than the excitation light LB. In the present embodiment, the dichroic mirror 18 transmits fluorescence.

The objective lens 20 concentrates the excitation light LB at the measurement-target member 22. Specifically, the objective lens 20 is a lens for concentrating the excitation light LB at the measurement-target member 22 and projecting the excitation light LB onto the measurement-target region 22B through a glass member 22A of the measurement-target member 22.

The objective lens 20 is provided with a second driving unit 38. The second driving unit 38 moves the objective lens 20 in a direction toward or away from the measurement-target member 22. On the other hand, the measurement-target member 22 is provided with a first driving unit 36. The first driving unit 36 moves the measurement-target member 22 in a direction toward or away from the objective lens 20. The focus of the objective lens 20 is adjusted by adjusting the interval between the objective lens 20 and the measurement-target member 22 (details will be described later). Note that the measurement unit 10 is only required to include at least one of the first driving unit 36 or the second driving unit 38 and is not limited to including both of them. Furthermore, in the following description, the interval between the objective lens 20 and the measurement-target member 22 may be referred to as a distance, a Z-axis direction distance, or the distance between the objective lens 20 and the measurement-target member 22.

In the description of the present embodiment, a direction along the directions in which the objective lens 20 and the measurement-target member 22 move toward and away from each other is referred to as the Z-axis direction. Furthermore, in the description of the present embodiment, it is assumed that the Z-axis direction and the optical axis A2 of the objective lens 20 are parallel. Furthermore, it is assumed that the two-dimensional plane of the surface of the measurement-target member 22 on which the excitation light LB is received is a plane represented by two axes orthogonal to the Z-axis direction (the X-axis direction and the Y-axis direction orthogonal to the X-axis direction).

Note that it has been described above that the longitudinal direction of the line-shaped irradiation light LA coincides with the X-axis direction. However, the longitudinal direction of the irradiation light LA (i.e., the longitudinal direction of the excitation light LB) may not coincide with the X-axis direction.

The measurement-target member 22 includes a glass member 22A, a measurement-target region 22B, and a glass member 22C.

The glass member 22C is a member for placing the sample S. The glass member 22C is a glass slide, for example. Note that the glass member 22C may be any member on which the sample S can be placed and is not limited to a member formed by glass.

The glass member 22A is a piece of glass for holding the sample S between it and the glass member 22C. The glass member 22A may be referred to as a cover glass. The glass member 22A may be any member that transmits the excitation light LB and fluorescence emitted from the sample S. To transmit means that the optical transmittance of a transmitting object is 80% or more.

The measurement-target region 22B is a region between the glass member 22A and the glass member 22C. The sample S is placed in the measurement-target region 22B.

The sample S is a measurement target. In the present embodiment, the sample S emits fluorescence as a result of projection of the excitation light LB. For example, the sample S is a microorganism, a cell, a liposome, a red blood cell in blood, a white blood cell, a platelet, a vascular endothelial cell, a minute epithelium cell piece, a slice of pathological tissue of various organs, or the like. Note that the sample S may be a substance such as a cell labeled by fluorescent colorant that emits fluorescence as a result of projection of the excitation light LB.

Note that the sample S may be placed in the measurement-target region 22B in a state of being mounted in a mounting medium. As the mounting medium, a known material that transmits the excitation light LB entering the measurement-target region 22B and fluorescence emitted by the sample S can be used. Furthermore, the mounting medium may be any of liquid and solid.

When being irradiated with the excitation light LB, the sample S emits fluorescence. Note that the mounting medium present in the measurement-target region 22B may also emit fluorescence. Thus, in the following description, it may be mentioned that fluorescence is emitted from the measurement-target region 22B.

The fluorescence emitted from the measurement-target region 22B as a result of projection of the excitation light LB is transmitted through the objective lens 20 and the dichroic mirror 18 to reach the emission filter 24. The emission filter 24 selectively transmits the fluorescence emitted from the measurement-target region 22B. Thus, the excitation light LB is not transmitted through the emission filter 24, and only the fluorescence emitted from the measurement-target region 22B is selectively transmitted through the emission filter 24.

The fluorescence transmitted through the emission filter 24 reaches the half mirror 26. The half mirror 26 routes a part of the fluorescence to the detection unit 30 and the remainder to the image detecting unit 34. Note that the proportions of distribution of the fluorescence to the detection unit 30 and the image detecting unit 34 by the half mirror 26 may be equal proportions (for example, 50% and 50%) or may be different proportions. Thus, a dichroic mirror may be used instead of the half mirror 26.

Fluorescence reflected by the half mirror 26 is concentrated at the detection unit 30 by the imaging lens 28. On the other hand, fluorescence transmitted through the half mirror 26 is concentrated at the image detecting unit 34 by the imaging lens 32.

Note that it is assumed that the light-emitting unit 14A of the irradiation unit 14 and the measurement-target member 22 are optically conjugate. Furthermore, it is assumed that the light-emitting unit 14A, the measurement-target member 22, the detection unit 30, and the image detecting unit 34 are optically conjugate. That is, it is assumed that the measurement unit 10 is a microscopic optical system of a coaxial vertical illumination type.

The image detecting unit 34 receives fluorescence and outputs a fluorescence image representing the received fluorescence. The fluorescence image is used for analysis on the type of the sample S or the like. For example, the image detecting unit 34 is a known line sensor or area sensor. For example, the image detecting unit 34 outputs a fluorescence image to an analysis device for analyzing the fluorescence image or the like.

On the other hand, the detection unit 30 includes a plurality of light-receiving units, receives fluorescence emitted from the measurement-target region 22B, and outputs a fluorescence signal.

Figure 2A:
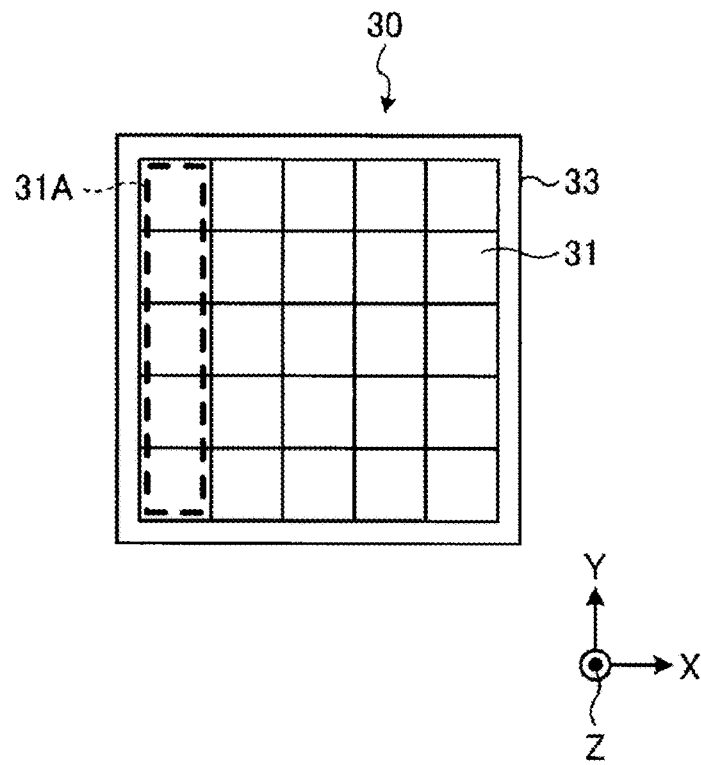
FIG. 2A is a schematic diagram showing an example of a detection unit according to the first embodiment of the present disclosure.

FIG. 2A is a schematic diagram showing an example of the detection unit 30. The detection unit 30 includes a plurality of light-receiving units 31. The light-receiving units 31 are devices for converting received fluorescence into electric charges. The light-receiving units 31 are photodiodes, for example. FIG. 2A shows an example of the detection unit 30 in which the plurality of light-receiving units 31 is two-dimensionally arrayed along a light-receiving surface 33 on which fluorescence is received.

For example, the detection unit 30 is a Complementary Metal-Oxide Semiconductor (CMOS) image sensor, a Charge Coupled Device (CCD) image sensor, or the like.

Figure 2B:
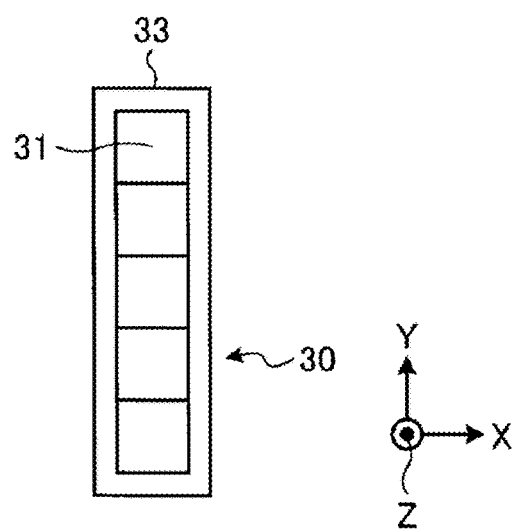
FIG. 2B is a schematic diagram showing an example of the detection unit according to the first embodiment of the present disclosure.

Note that the detection unit 30 may be in a form in which the plurality of light-receiving units 31 is one-dimensionally arrayed. FIG. 2B is a schematic diagram showing an example of the detection unit 30. For example, the detection unit 30 may be in a form in which the plurality of light-receiving units 31 is one-dimensionally arrayed along the light-receiving surface 33. Furthermore, the detection unit 30 is only required to include at least two light-receiving units 31.

The present embodiment will be described by using an example in which the detection unit 30 is in a form in which the plurality of light-receiving units 31 is two-dimensionally arrayed along the light-receiving surface 33.

Note that the detection unit 30 may have a configuration in which a plurality of block regions 31A is arrayed along the light-receiving surface 33, each block region 31A including a plurality of types of light-receiving units 31 that is different in at least one of gain or charge accumulation time (see FIG. 2A). Gain refers to at least one of analog-to-digital conversion gain or amplification gain. Charge accumulation time refers to charge accumulation time for each output of a fluorescence signal in a case where the detection unit 30 is a detection unit 30 of a charge accumulation type such as CMOS or CCD. In this case, each block region 31A may be regarded as one pixel.

The present embodiment will be described by using an example in which the plurality of light-receiving units 31 included in the detection unit 30 has the same gain and charge accumulation time. The detection unit 30 receives fluorescence and outputs a fluorescence signal.

The fluorescence signal output from the detection unit 30 is a signal indicating intensity values of fluorescence received by respective ones of the plurality of light-receiving units 31. In other words, the fluorescence signal is a signal that defines intensity values of fluorescence for respective ones of the plurality of light-receiving units 31. In the following description, an intensity value of fluorescence may be referred to as a fluorescence intensity value. A fluorescence intensity value is a value indicating the intensity of received fluorescence. The detection unit 30 outputs the fluorescence signal to the focus adjustment device 12.

Note that it is assumed that a light-receiving unit 31 is provided for each one or more pixels. In this case, the fluorescence signal is a fluorescence image that defines fluorescence intensity values of pixels corresponding to respective ones of the plurality of light-receiving units 31. In this case, the fluorescence intensity values correspond to pixel values.

Returning to FIG. 1, the description will be continued. Note that, in the present embodiment, the measurement unit 10 projects the excitation light LB onto the measurement-target member 22 by scanning along a direction (Y-axis direction) orthogonal to the longitudinal direction of the irradiation light LA (X-axis direction). The scanning method of the excitation light LB is not limited. For example, the scanning method is a method of moving the measurement-target member 22 in the Y-axis direction by the first driving unit 36, a method of moving portions of the measurement unit 10 other than the measurement-target member 22 in the Y-axis direction relative to the measurement-target member 22, or the like. Furthermore, a deflection mirror may be arranged between the dichroic mirror 18 and the objective lens 20 so that the excitation light LB scans by means of the polarization mirror.

Next, the focus adjustment device 12 will be described.

The focus adjustment device 12 is an example of an information processing device. The focus adjustment device 12 adjusts the focus of the objective lens 20 on the basis of a fluorescence signal received from the detection unit 30. The focus adjustment device 12 and each of the detection unit 30, the first driving unit 36, and the second driving unit 38 are connected in a manner capable of sending/receiving data or signals.

Figure 3:
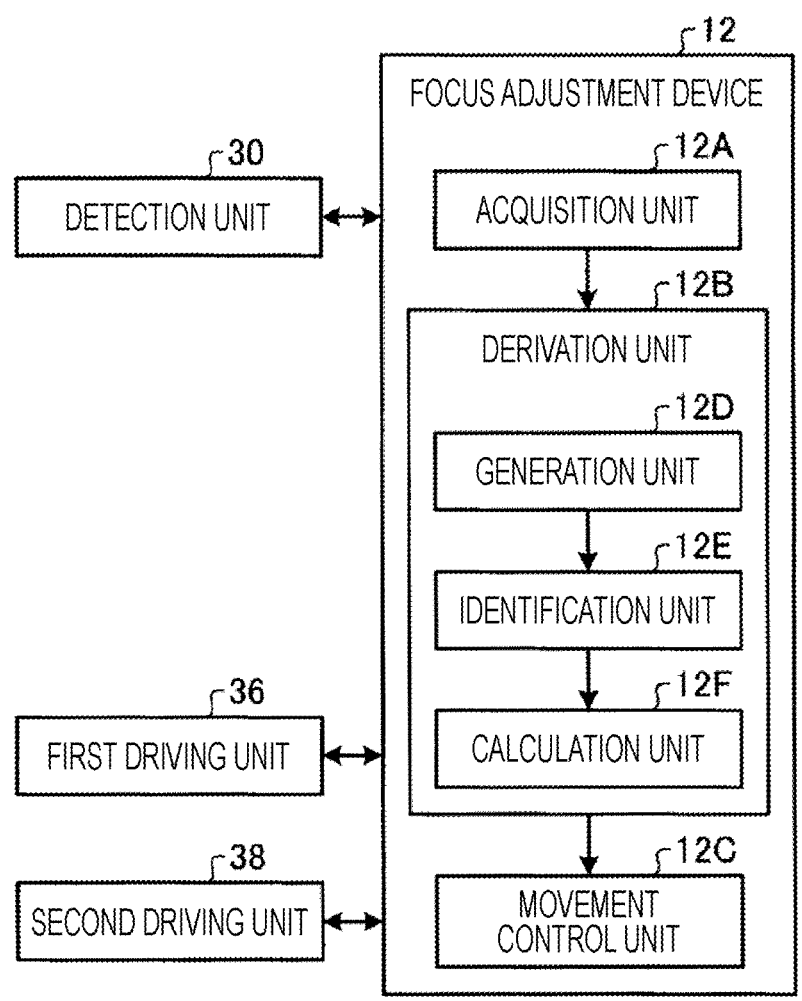
FIG. 3 is a diagram showing an example of the functional configuration of a focus adjustment device 12 according to the first embodiment of the present disclosure.

FIG. 3 is a diagram showing an example of the functional configuration of the focus adjustment device 12. Note that FIG. 3 also shows the detection unit 30, the first driving unit 36, and the second driving unit 38 for the sake of description.

The focus adjustment device 12 includes an acquisition unit 12A, a derivation unit 12B, and a movement control unit 12C. The derivation unit 12B includes a generation unit 12D, an identification unit 12E, and a calculation unit 12F.

For example, some or all of the acquisition unit 12A, the derivation unit 12B, the movement control unit 12C, the generation unit 12D, the identification unit 12E, and the calculation unit 12F may be realized by causing a processing device such as a Central Processing Unit (CPU) to execute programs, that is, by software, may be realized by hardware such as an Integrated Circuit (IC), or may be realized by using software and hardware in conjunction.

The acquisition unit 12A acquires a fluorescence signal from the detection unit 30.

The derivation unit 12B derives a movement amount and a movement direction of at least one of the objective lens 20 or the measurement-target member 22 on the basis of the fluorescence signal acquired from the detection unit 30. Specifically, the derivation unit 12B derives the above-mentioned movement amount and the above-mentioned movement direction for focusing the objective lens 20 on the measurement-target region 22B on the basis of the fluorescence signal.

In the present embodiment, the derivation unit 12B includes the generation unit 12D, the identification unit 12E, and the calculation unit 12F.

The generation unit 12D generates a profile of fluorescence intensity values included in the fluorescence signal. Specifically, the generation unit 12D generates a profile of fluorescence intensity values with respect to a direction of occurrence of blurring in a fluorescence-receiving region included in the fluorescence signal. Note that the profile of fluorescence intensity values is represented by a graph having a horizontal axis indicating the direction of occurrence of blurring and a vertical axis indicating fluorescence intensity values and showing a relationship between the direction of occurrence of blurring and fluorescence intensity values.

The fluorescence-receiving region is a region included in the fluorescence signal in which fluorescence emitted from the measurement-target region 22B is received and fluorescence intensity values are larger than other regions. The generation unit 12D may identify in advance the direction of occurrence of blurring in the fluorescence-receiving region included in the fluorescence signal and use it to generate the profile.

Figure 4:
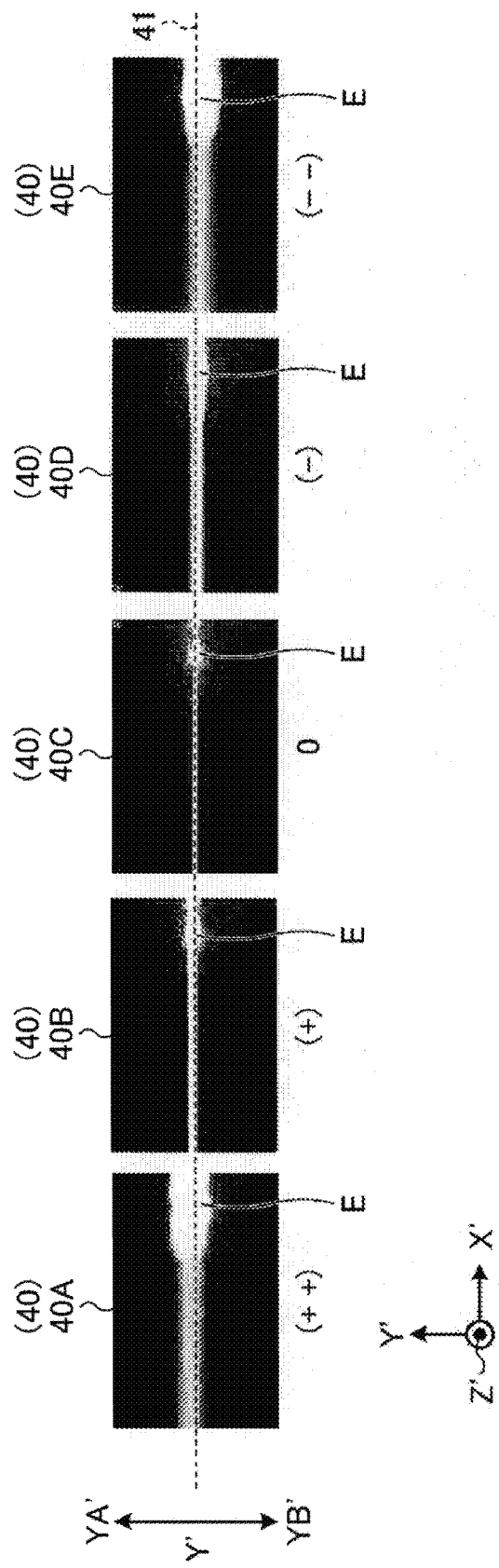
FIG. 4 is a schematic diagram showing an example of fluorescence signals according to the first embodiment of the present disclosure.

FIG. 4 is a schematic diagram showing an example of fluorescence signals 40. The fluorescence signals 40 include a fluorescence-receiving region E. FIG. 4 shows fluorescence signals 40 obtained by the detection unit 30 in respective steps of changing the distance between the measurement-target member 22 and the objective lens 20 from a short distance to a long distance in a stepwise manner. The plurality of fluorescence signals 40 (a fluorescence signal 40A to a fluorescence signal 40E) shown in FIG. 4 is an example of fluorescence signals 40 detected in respective steps of increasing the distance between the measurement-target member 22 and the objective lens 20 in a stepwise manner from the fluorescence signal 40A toward the fluorescence signal 40E. Furthermore, the fluorescence signal 40C is an example of a fluorescence signal 40 when the objective lens 20 is focused on the measurement-target region 22B.

Furthermore, the vertical-axis direction (Y'-axis direction) of the fluorescence signals 40 shown in FIG. 4 corresponds to the Y-axis direction on the measurement-target member 22. Furthermore, the horizontal-axis direction (X'-axis direction) of the fluorescence signals 40 shown in FIG. 4 corresponds to the X-axis direction on the measurement-target member 22. Furthermore, the Z'-axis direction of the fluorescence signals 40 shown in FIG. 4 corresponds to the Z-axis direction, which is a direction in which the measurement-target member 22 and the objective lens 20 move toward or away from each other.

As shown by the fluorescence signal 40A, the direction of occurrence of blurring in the fluorescence-receiving region E included in the fluorescence signal 40 moves toward one side of the light-receiving surface 33 of the detection unit 30 (in the direction of arrow YA') as the distance between the measurement-target member 22 and the objective lens 20 is shorter. Specifically, the direction of occurrence of blurring in the fluorescence-receiving region E moves in the direction of arrow YA' from a center line 41 as the distance between the measurement-target member 22 and the objective lens 20 is shorter. This is because the measurement-target member 22 is located closer to the objective lens 20 than the focus of the objective lens 20 as the distance between the measurement-target member 22 and the objective lens 20 is shorter. Note that the center line 41 is a line passing through the fluorescence-receiving region E included in the fluorescence signal 40C obtained when the objective lens 20 is focused on the measurement-target region 22B.

On the other hand, as shown by the fluorescence signal 40E, the direction of occurrence of blurring in the fluorescence-receiving region E included in the fluorescence signal 40 moves toward the other side of the light-receiving surface 33 of the detection unit 30 (in the direction of arrow YB') as the distance between the measurement-target member 22 and the objective lens 20 is longer. Specifically, the direction of occurrence of blurring in the fluorescence-receiving region E moves in the direction of arrow YB' from a center line 41 as the distance between the measurement-target member 22 and the objective lens 20 is longer. This is because the measurement-target member 22 is located farther from the focus of the objective lens 20 as the distance between the measurement-target member 22 and the objective lens 20 is longer. Thus, as the distance between the measurement-target member 22 and the objective lens 20 is longer, the direction of occurrence of blurring in the fluorescence-receiving region E moves in a direction opposite to that in a case where the distance between the measurement-target member 22 and the objective lens 20 is shorter.

Thus, the generation unit 12D changes the distance between the measurement-target member 22 and the objective lens 20 in a stepwise manner and identifies in advance the direction of occurrence of blurring in the fluorescence-receiving region E included in a fluorescence signal 40 on the basis of fluorescence signals 40 obtained in respective steps. In the case of FIG. 4, the generation unit 12D identifies the Y'-axis direction in a fluorescence signal 40 as the direction of occurrence of blurring in the fluorescence-receiving region E.

Then, the generation unit 12D generates a profile of fluorescence intensity values with respect to the direction of occurrence of blurring in the fluorescence-receiving region E included in the fluorescence signal 40 (Y'-axis direction).

The profile of fluorescence intensity values is represented by f(y'). The symbol y' indicates a position in the Y'-axis direction, which is the direction of occurrence of blurring in the fluorescence-receiving region E included in the fluorescence signal 40. A position in the Y'-axis direction is represented by positional coordinates indicating a pixel position in the Y'-axis direction, for example.

Figure 5:
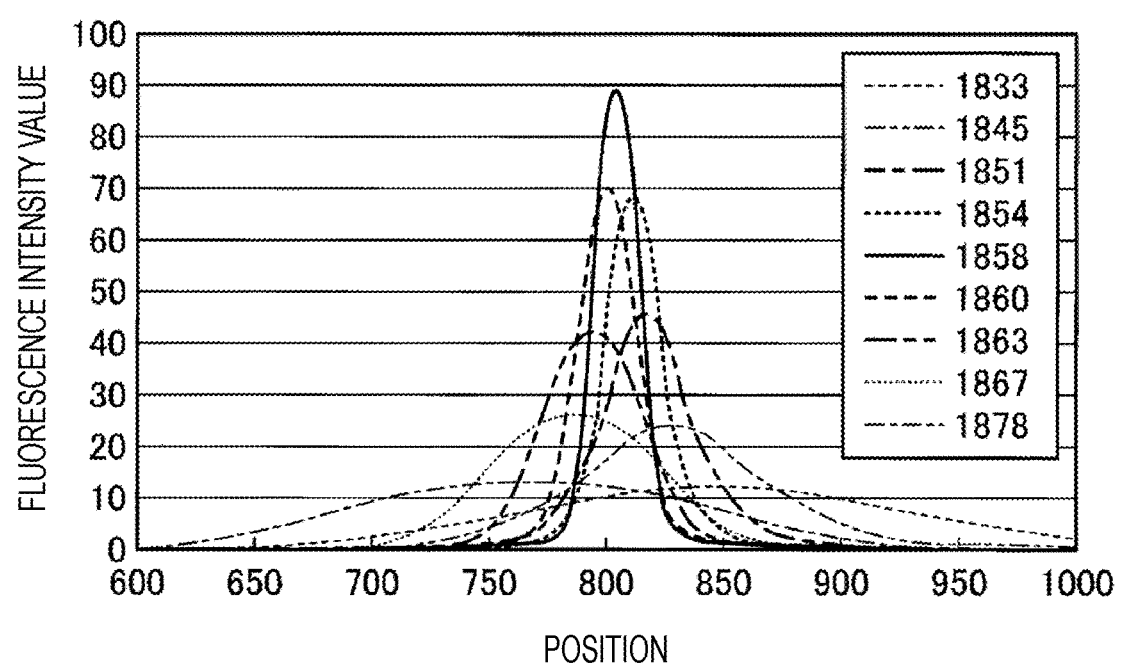
FIG. 5 is a schematic diagram showing an example of a profile of fluorescence intensity values according to the first embodiment of the present disclosure.

FIG. 5 is a schematic diagram showing an example of the profile of fluorescence intensity values. In FIG. 5, the horizontal axis indicates the position in the direction of occurrence of blurring in the fluorescence signals 40 (Y'-axis direction). In FIG. 5, the vertical axis indicates the fluorescence intensity value. Furthermore, in FIG. 5, regarding the values indicating the respective graphs, a larger value indicates a shorter distance between the objective lens 20 and the measurement-target member 22. Every time of acquiring one fluorescence signal 40, the generation unit 12D generates a profile of fluorescence intensity values included in the fluorescence signal 40. Thus, when acquiring one fluorescence signal 40, the generation unit 12D generates a profile represented by any one of the plurality of graphs shown in FIG. 5, for example.

Note that the generation unit 12D may generate a profile of fluorescence intensity values by using fluorescence intensity values in the fluorescence-receiving region E included in the fluorescence signal 40. That is, the generation unit 12D may generate a profile of fluorescence intensity values for the fluorescence-receiving region E, which is a portion of the fluorescence signal 40, instead of the entire fluorescence signal 40. In this case, for example, the generation unit 12D may generate the profile by identifying, as the fluorescence-receiving region E, a region of the fluorescence signal 40 indicating a fluorescence intensity value that is greater than or equal to a threshold for determining that fluorescence is received.

Returning to FIG. 3, the description will be continued. Next, the identification unit 12E will be described. The identification unit 12E identifies the barycentric position of fluorescence intensity values in the fluorescence signal 40 on the basis of the profile generated by the generation unit 12D.

The identification unit 12E calculates the barycentric position by using equation (1) below.

$$g = (\Sigma y' f(y') y') / (\Sigma y' f(y')) \qquad \text{equation (1)}$$

In equation (1), the symbol g indicates the barycentric position. The symbol f(y') indicates the profile of fluorescence intensity values as described above. The symbol y' indicates a position in the Y'-axis direction, which is the direction of occurrence of blurring in the fluorescence-receiving region E included in the fluorescence signal 40, as described above.

Note that the identification unit 12E may calculate the barycentric position by using a profile obtained by performing at least one of binning or thresholding on the profile f(y') of fluorescence intensity values instead of the profile f(y') of fluorescence intensity values.

For example, the identification unit 12E may calculate the barycentric position by using a profile f(y') after performing binning on the profile f(y') of fluorescence intensity values.

Furthermore, for example, the identification unit 12E may calculate the barycentric position by using a profile F(y') obtained by extracting portions at greater than or equal to a threshold that is a predetermined fluorescence intensity value from the profile f(y') after performing binning.

The calculation unit 12F identifies a target barycentric position and calculates the above-mentioned movement amount and the above-mentioned movement direction on the basis of the difference between the barycentric position and the target barycentric position. In the present embodiment, the calculation unit 12F derives the movement amount and the movement direction of at least one of the objective lens 20 or the measurement-target member 22 on the basis of the difference between the barycentric position identified by the identification unit 12E and the target barycentric position.

The target barycentric position is a barycentric position of fluorescence intensity values when the objective lens 20 is focused on the measurement-target region 22B. Specifically, the target barycentric position corresponds to a position with the largest difference between adjacent pixel values (luminance values) in a captured image of the measurement-target member 22 irradiated with the excitation light LB. This position may be a position in the Y'-axis direction, which is the direction of occurrence of blurring mentioned above. The calculation unit 12F may identify in advance the target barycentric position and use it to calculate the movement amount and the movement direction.

For example, the calculation unit 12F identifies the target barycentric position by using a known contrast method. Note that the calculation unit 12F may identify the target barycentric position by receiving or reading the target barycentric position identified by an external device or the like using a contrast method.

Figure 6:
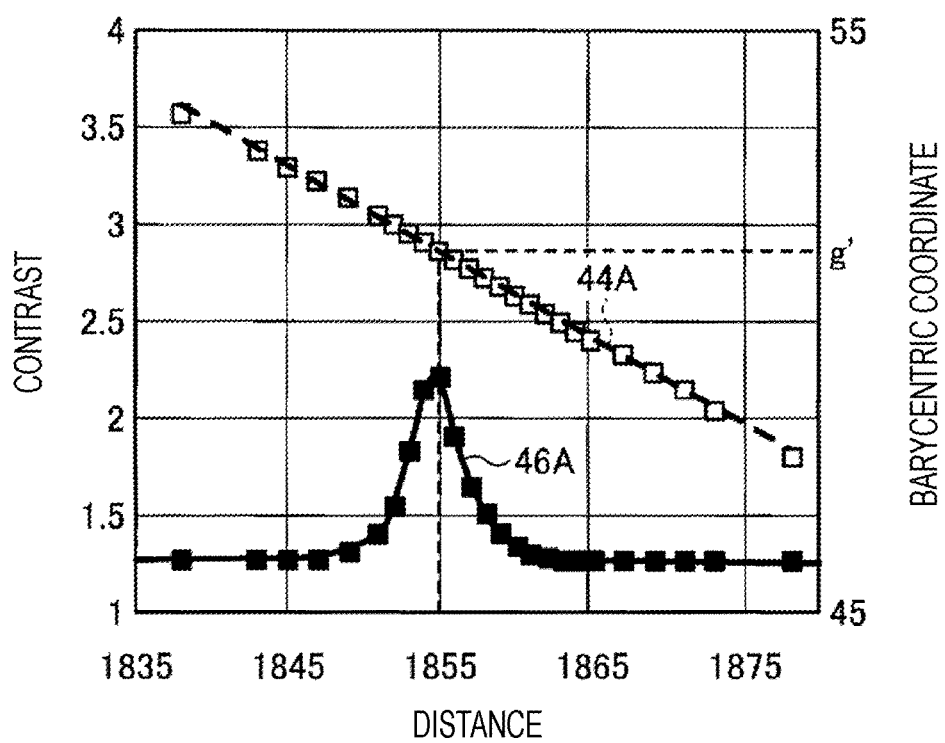
FIG. 6 is an illustrative diagram of Example 1 according to the first embodiment of the present disclosure.

FIG. 6 is an illustrative diagram of Example 1 according to the present embodiment. The identification of the target barycentric position will be described by using Example 1 as an example.

In FIG. 6, the horizontal axis indicates the distance (Z-axis direction distance) between the measurement-target member 22 and the objective lens 20. Note that, on the horizontal axis indicating the distance, a larger value indicates a shorter distance (a shorter distance between the measurement-target member 22 and the objective lens 20). On the other hand, the vertical axis indicates the contrast or barycentric position. The contrast shown in FIG. 6 indicates an average value of the differences between the pixel values (luminance values) of adjacent pixels in a captured image.

In FIG. 6, the distance between the measurement-target member 22 and the objective lens 20 is varied in a range of ±20 μm from when the objective lens 20 is focused on the measurement-target region 22B. Furthermore, a measurement target stained with DAPI (4',6-diamidino-2-phenylindole), which is a fluorescent colorant, is arranged in the measurement-target region 22B as the sample S.

Figure 7A:
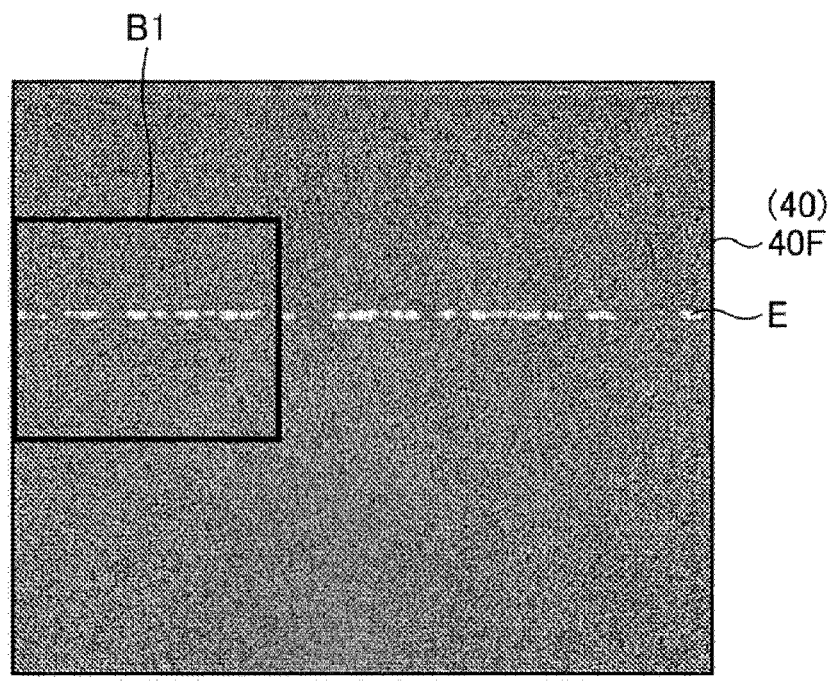
FIG. 7A is a schematic diagram showing an example of a fluorescence signal according to the first embodiment of the present disclosure.

In FIG. 6, a graph 44A indicates the barycentric position identified by the identification unit 12E by using fluorescence signals 40 obtained by projection of the excitation light LB having an asymmetric shape with respect to the optical axis in respective steps of varying the above-mentioned distance in a stepwise manner. FIG. 7A shows an example of a fluorescence signal 40F obtained when the above-mentioned distance is at a certain step. The identification unit 12E identifies the barycentric position by using a profile f(y') in a region B1 including the fluorescence-receiving region E in the fluorescence signal 40F. The graph 44A is a graph indicating results of performing identification of the barycentric position using this region B1 by using fluorescence signals 40 corresponding to respective ones of a plurality of steps of the above-mentioned distance.

Figure 7B:
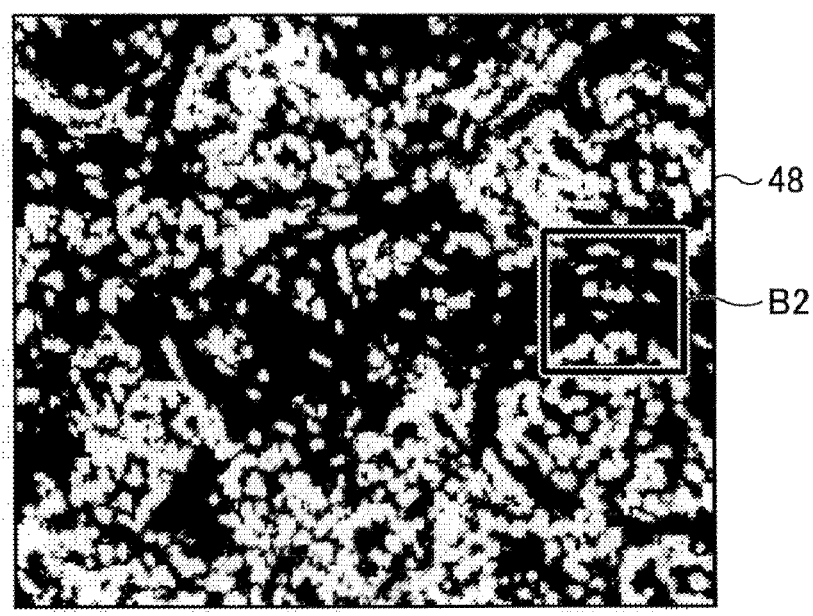
FIG. 7B is a schematic diagram showing an example of a captured image according to the first embodiment of the present disclosure.

On the other hand, in FIG. 6, a graph 46A is a graph indicating results of a contrast method. Specifically, the graph 46A indicates results of calculating the contrast by a known method for the above-mentioned distance by using captured images obtained by projecting light having a target shape with respect to the optical axis onto the measurement-target region 22B. FIG. 7B shows an example of a captured image 48 obtained when the above-mentioned distance is at a certain step. The graph 46A indicates results of calculating, as the contrast, an average value of the differences between the pixel values (luminance values) of adjacent pixels in a particular region B2 of the captured image 48.

As shown by the graph 44A in FIG. 6, the relationship between the distance between the objective lens 20 and the measurement-target member 22 and the barycentric position is represented by a linear function. On the other hand, as shown by the graph 46A in FIG. 6, the relationship between the distance between the objective lens 20 and the measurement-target member 22 and the contrast has a peak at a particular distance.

Thus, the calculation unit 12F identifies the distance indicating the peak obtained by the contrast method, shown in the graph 46A. Then, the calculation unit 12F can identify the barycentric position corresponding to the identified distance in the graph 44A as a target barycentric position g'.

Then, the calculation unit 12F derives a movement amount and a movement direction of at least one of the objective lens 20 or the measurement-target member 22 on the basis of the difference between the barycentric position identified by the identification unit 12E and the target barycentric position g'.

Figure 8:
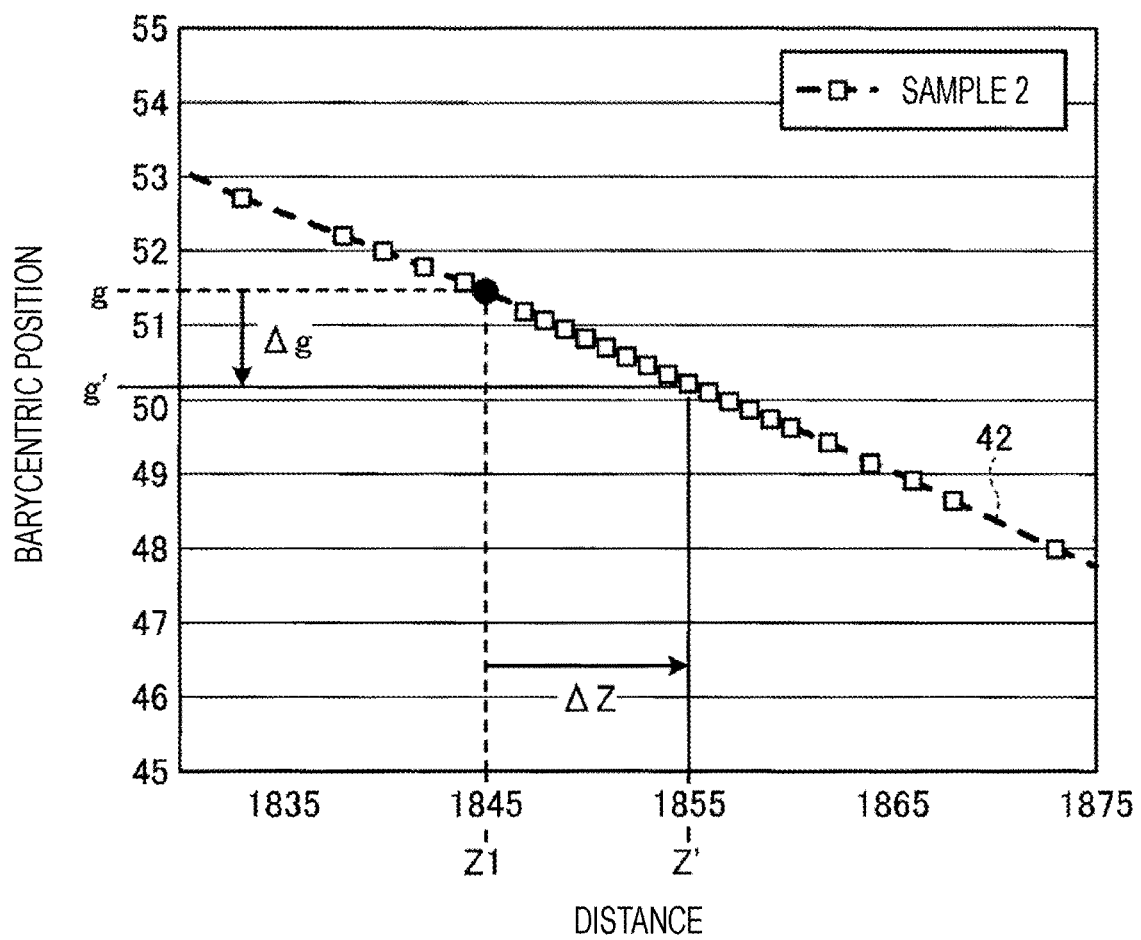
FIG. 8 is an illustrative diagram of derivation of a movement amount and a movement direction according to the first embodiment of the present disclosure.

FIG. 8 is an illustrative diagram of derivation of the movement amount and the movement direction. In FIG. 8, the vertical axis indicates the barycentric position. In FIG. 8, the horizontal axis indicates the distance between the measurement-target member 22 and the objective lens 20. Note that, as in FIG. 6, a larger value on the horizontal axis in FIG. 8 indicates a shorter distance (a shorter distance between the measurement-target member 22 and the objective lens 20).

First, the calculation unit 12F calculates the difference, Δg, between the barycentric position g identified by the identification unit 12E and the target barycentric position g'. Then, it calculates a movement amount and a movement direction of at least one of the objective lens 20 or the measurement-target member 22 for bringing the barycentric position g closer or equal to the target barycentric position g' such that the difference Δg becomes "0".

For example, it is assumed that the calculation unit 12F calculates the movement amount and the movement direction of the objective lens 20. Furthermore, a graph 42 in FIG. 8 is assumed to correspond to the graph 44A shown in FIG. 6.

In this case, the calculation unit 12F calculates the difference between a distance Z1, which corresponds to the identified barycentric position g on the graph 42, and a distance Z', which corresponds to the target barycentric position g', as the movement amount of the objective lens 20 such that the distance Z1 equals the distance Z'.

Furthermore, as described above, a larger value on the horizontal axis in FIG. 8 indicates a shorter distance (a shorter distance between the measurement-target member 22 and the objective lens 20). Thus, in a case where the value of the distance Z1 is smaller than the value of the distance Z' (Z1<Z'), the calculation unit 12F calculates a direction in which the measurement-target member 22 and the objective lens 20 are moved closer to each other (direction of decreasing the distance) as the movement direction. Furthermore, in a case where the value of the distance Z1 is larger than the value of the distance Z' (Z1>Z'), the calculation unit 12F calculates a direction in which the measurement-target member 22 and the objective lens 20 are moved away from each other (direction of increasing the distance) as the movement direction.

Note that the calculation unit 12F may prepare in advance a function T for deriving a vector indicating the movement amount and the movement direction from the difference Δg between the identified barycentric position g and the target barycentric position g', and use the function T to derive the movement amount and the movement direction. For example, a function obtained by approximating the graph 42 shown in FIG. 8 by a linear function can be used as the function T. Note that the function T may be a function obtained by the approximating the graph 42 by a higher-order function instead of a linear function. Furthermore, a function table such as a lookup table may be used as the function T.

Returning to FIG. 3, the description will be continued. The movement control unit 12C moves at least one of the objective lens 20 or the measurement-target member 22 by the movement amount in the movement direction derived by the derivation unit 12B. Specifically, the movement control unit 12C performs driving control of at least one of the first driving unit 36 or the second driving unit 38 to move by the movement amount derived by the derivation unit 12B in the movement direction derived by the derivation unit 12B.

Thus, the movement control unit 12C can adjust the position of at least one of the objective lens 20 or the measurement-target member 22 such that the focus of the objective lens 20 falls within the measurement-target region 22B of the measurement-target member 22. Note that the functional configuration shown in FIG. 3 is an example, and the movement control unit 12C may include the derivation unit 12B.

Next, an example of a flow of information processing performed by the focus adjustment device 12 will be described.

Figure 9:
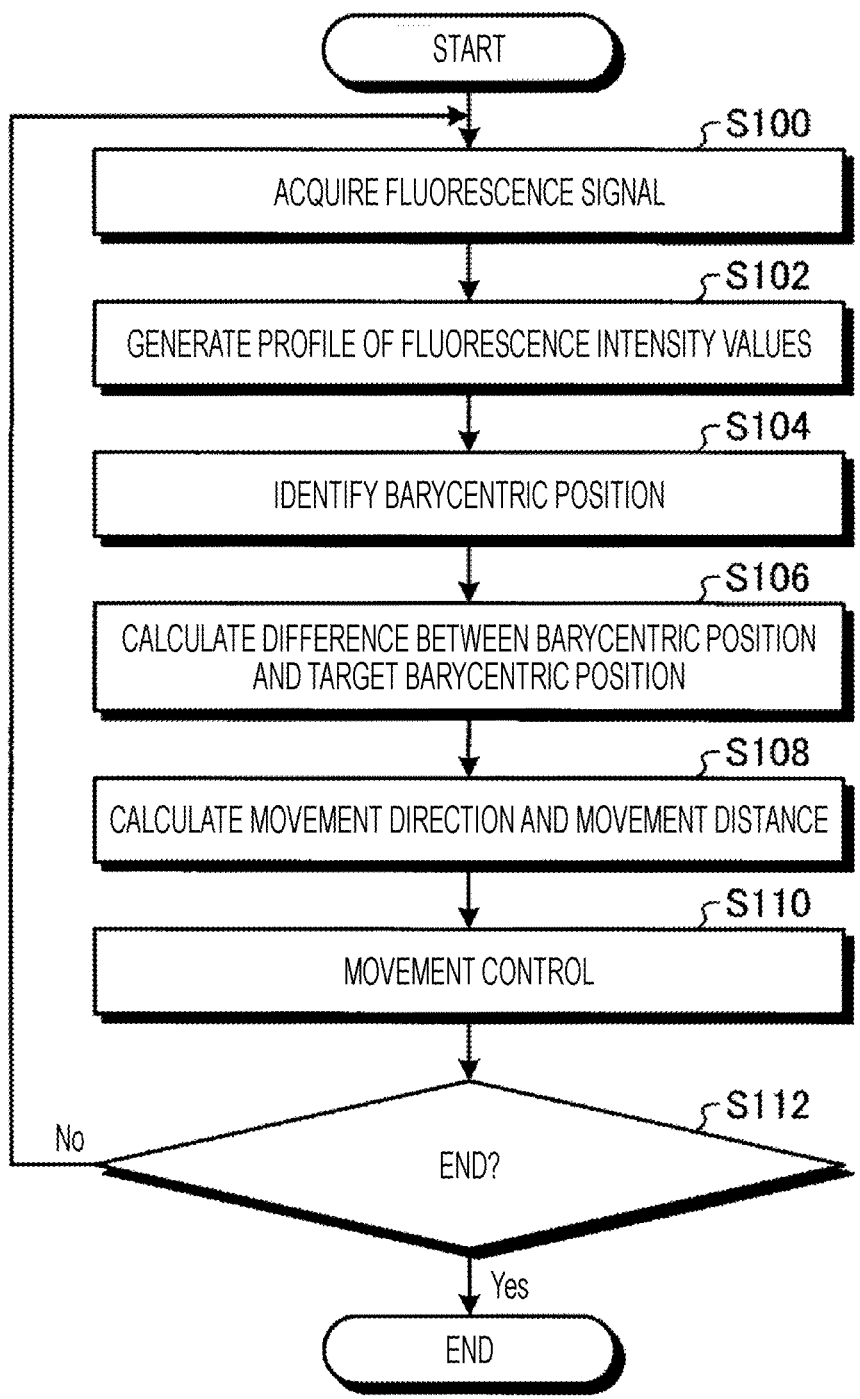
FIG. 9 is a flow chart showing an example of a flow of information processing according to the first embodiment of the present disclosure.

FIG. 9 is a flow chart showing an example of a flow of information processing.

The acquisition unit 12A acquires a fluorescence signal 40 from the detection unit 30 (step S100).

The generation unit 12D generates a profile of fluorescence intensity values included in the fluorescence signal 40 acquired in step S100 (step S102). In step S102, the generation unit 12D generates a profile of fluorescence intensity values with respect to a direction of occurrence of blurring in a fluorescence-receiving region E included in the fluorescence signal 40 (Y'-axis direction).

The identification unit 12E identifies a barycentric position g of fluorescence intensity values in the fluorescence signal 40 on the basis of the profile generated in step S102 (step S104).

Next, the calculation unit 12F calculates the difference, Δg, between the barycentric position g identified in step S104 and a target barycentric position g' (step S106). Next, the calculation unit 12F calculates a movement amount and a movement direction of at least one of the objective lens 20 or the measurement-target member 22 by using the difference Δg calculated in step S106 (step S108).

The movement control unit 12C moves at least one of the objective lens 20 or the measurement-target member 22 by the movement amount in the movement direction derived by the derivation unit 12B (step S110). The movement control unit 12C moves at least one of the objective lens 20 or the measurement-target member 22 by performing driving control of the at least one of the first driving unit 36 or the second driving unit 38. Thus, the positions of the objective lens 20 and the measurement-target member 22 are adjusted such that the objective lens 20 is focused on the measurement-target region 22B of the measurement-target member 22.

Next, the focus adjustment device 12 determines whether or not to end the information processing (step S112). For example, the focus adjustment device 12 makes the determination of step S112 by determining whether or not an instruction signal indicative of ending the processing is received. In a case where it is determined to continue the processing (step S112: No), return to step S100 above. On the other hand, in a case where it is determined to end the processing (step S112: Yes), this routine ends.

As described above, the microscope system 1 of the present embodiment includes the irradiation unit 14, the objective lens 20, the detection unit 30, the derivation unit 12B, and the movement control unit 12C. The irradiation unit 14 projects excitation light LB having an asymmetric shape with respect to the optical axis. The objective lens 20 concentrates the excitation light LB at the measurement-target member 22 including the glass member 22A and the measurement-target region 22B. The detection unit 30 includes at least one or more light-receiving units 31 that receive fluorescence emitted from the measurement-target region 22B in response to the excitation light LB, and outputs a fluorescence signal 40 indicating intensity values (fluorescence intensity values) of fluorescence received by the respective light-receiving units 31. The movement control unit 12C includes the derivation unit 12B that derives a movement amount and a movement direction of at least one of the objective lens 20 or the measurement-target member 22 on the basis of the fluorescence signal 40, and moves at least one of the objective lens 20 or the measurement-target member 22 by the derived movement amount in the derived movement direction.

As described, in the microscope system 1 of the present embodiment, the excitation light LB having an asymmetric shape is concentrated at the measurement-target member 22, and the fluorescence signal 40 indicating the fluorescence intensity values of fluorescence emitted from the measurement-target region 22B is output. In addition, in the microscope system 1, the fluorescence signal 40 is used to derive the movement amount and the movement direction of at least one of the objective lens 20 or the measurement-target member 22 and control movement thereof.

On the other hand, in the prior art, light having an asymmetric shape with respect to the optical axis is projected onto a sample S, and focus control is performed on the basis of the position where light reflected from the sample S is received. However, in measurement of the sample S such as cells, the sample sandwiched by glass plates may be used. In this case, the light projected onto the sample S is reflected by the surface of the glass member 22A and the sample S, which is arranged across the glass member 22A. Thus, light reflected from the interface between air and the glass member 22A is dominant over light reflected from the sample S. In the prior art, since the focus control is performed by using the reflected light, the focus is placed on the surface of the glass member 22A, and thus it has been difficult to easily focus on the measurement-target region 22B arranged across the glass member 22A.

Furthermore, in the prior art, there has also been a technique of focusing the objective lens 20 on the sample S by repeating an operation of measuring the contrast of a captured image of the sample S while moving the position of the objective lens 20. However, in this prior art technique, it is necessary to repeat the movement of the position of the objective lens 20 and the image capture of the sample S a plurality of times, and it has been difficult to easily focus on the measurement-target region 22B.

On the other hand, in the microscope system 1 of the present embodiment, fluorescence emitted from the measurement-target region 22B in light reflected from the measurement-target member 22 is selectively received. In addition, in the microscope system 1, focus control is performed to control movement of at least one of the objective lens 20 or the measurement-target member 22 by using the fluorescence signal 40 indicating fluorescence intensity values of the received fluorescence.

The wavelength range of the fluorescence emitted from the measurement-target region 22B does not include the wavelength range of the reflected light of the excitation light LB reflected by the surface of the glass member 22A. Thus, in the microscope system 1, the focus control can be performed by selectively using the fluorescence emitted from the measurement-target region 22B. Thus, in the microscope system 1 of the present embodiment, it is possible to easily focus on the measurement-target region 22B arranged across the glass member 22A, not on the surface of the glass member 22A.

Therefore, in the microscope system 1 of the present embodiment, it is possible to easily focus on the measurement-target region 22B arranged across the glass (glass member 22A).

Furthermore, in the microscope system 1 of the present embodiment, it is possible to easily focus on the measurement-target region 22B even in a case where the sample S is not present in the measurement-target region 22B or a case where a low-density (sparse) region of the sample S is present in the measurement-target region 22B.

Figure 10:
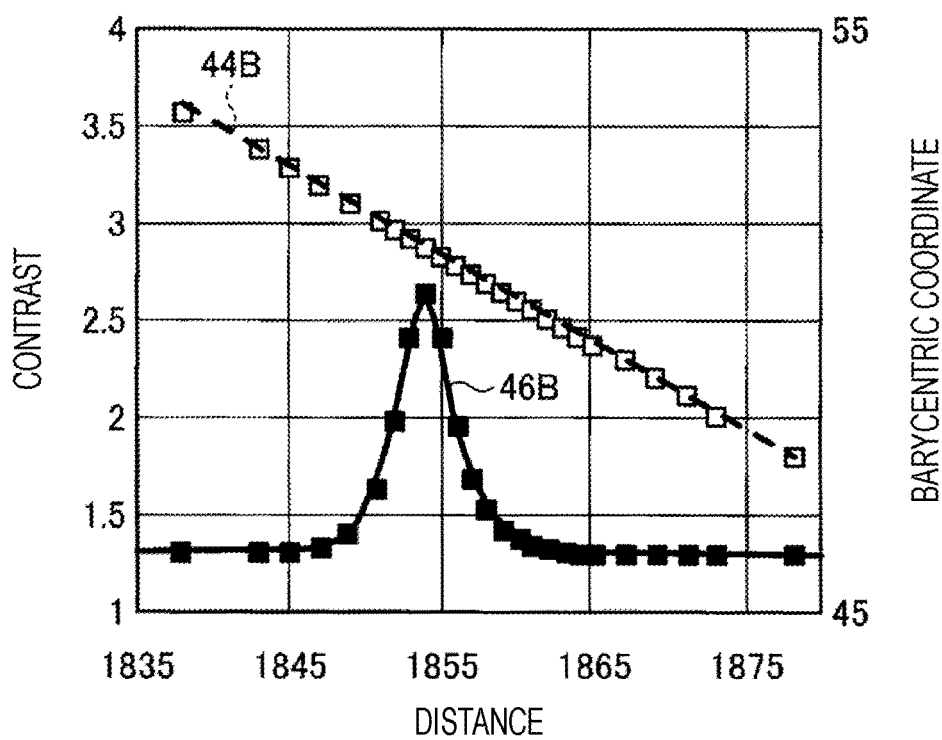
FIG. 10 is an illustrative diagram of Example 2 according to the first embodiment of the present disclosure.

FIG. 10 is an illustrative diagram of Example 2 in the present embodiment.

In FIG. 10, the horizontal axis indicates the distance (Z-axis direction distance) between the measurement-target member 22 and the objective lens 20. On the other hand, the vertical axis indicates the contrast or barycentric position.

In FIG. 10, the distance between the measurement-target member 22 and the objective lens 20 is varied in a range of ±20 μm from when the objective lens 20 is focused on the measurement-target region 22B. Furthermore, only the mounting medium is contained and the sample S is not contained in the measurement-target region 22B.

Figure 11A:
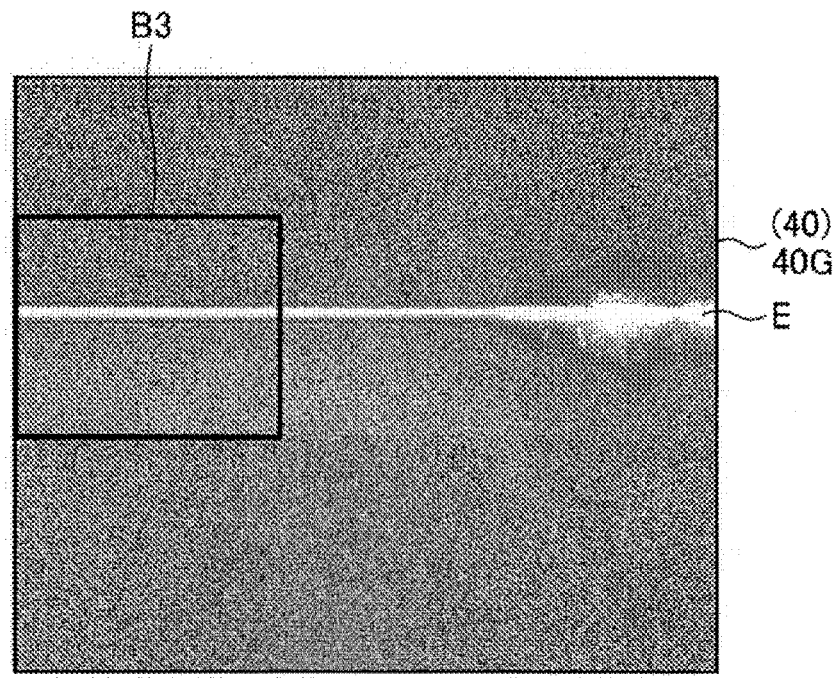
FIG. 11A is a schematic diagram showing an example of a fluorescence signal according to the first embodiment of the present disclosure.

In FIG. 10, a graph 44B indicates the barycentric position identified by the identification unit 12E by using fluorescence signals 40 obtained by projection of the excitation light LB having an asymmetric shape with respect to the optical axis in respective steps of varying the above-mentioned distance in a stepwise manner. FIG. 11A shows an example of a fluorescence signal 40G obtained when the above-mentioned distance is at a certain step. The identification unit 12E identifies the barycentric position by using a profile f(y') in a region B3 including the fluorescence-receiving region E in the fluorescence signal 40G. The graph 44B is a graph indicating results of performing identification of the barycentric position using this region B3 by using fluorescence signals 40 corresponding to respective ones of a plurality of steps of the above-mentioned distance.

Figure 11B:
FIG. 11B is a schematic diagram showing an example of a captured image according to the first embodiment of the present disclosure.

On the other hand, in FIG. 10, a graph 46B is a graph indicating results of a contrast method. Specifically, the graph 46B indicates results of calculating the contrast by a known method for the above-mentioned distance by using captured images obtained by projecting light having a target shape with respect to the optical axis onto the measurement-target region 22B. FIG. 11B shows an example of a captured image 49 obtained when the above-mentioned distance is at a certain step. The graph 46B indicates results of calculating, as the contrast, an average value of the differences between the pixel values (luminance values) of adjacent pixels in a particular region B4 of the captured image 49. Note that the particular region B4 is a region that is selectively identified as a region in which contrast occurs in the captured image 49.

As shown by the graph 44B in FIG. 10, even in a case where the sample S is not present in the measurement-target region 22B, results similar to those in the graph 44A (see FIG. 6) for a case where the sample S is present in the measurement-target region 22B are obtained in the graph 44B indicating the relationship between the distance and the barycentric position.

Thus, with the microscope system 1 of the present embodiment, it can be said that it is possible to easily focus on the measurement-target region 22B even in a case where the sample S is not present in the measurement-target region 22B. Furthermore, it can be said that, with the microscope system 1, it is possible to easily focus on the measurement-target region 22B even in a case where a sparse region of the sample S is included in the measurement-target region 22B.

On the other hand, the graph 46B in FIG. 10 in the prior-art contrast method is a graph obtained by using the region B4 in which contrast occurs in the captured image 49 (see FIG. 11B). Thus, in the conventional scheme shown by the graph 46B, it can be said that it is difficult to adjust the focus in a sparse region of the sample S or in a case where the sample S is not contained in the measurement-target region 22B.

Therefore, in the microscope system 1 of the present embodiment, it is possible to easily focus on the measurement-target region 22B even in a case where the sample S is not present in the measurement-target region 22B or a case where a sparse region of the sample S is included in the measurement-target region 22B.

Furthermore, the derivation unit 12B includes the generation unit 12D, the identification unit 12E, and the calculation unit 12F. The generation unit 12D generates a profile of fluorescence intensity values included in the fluorescence signal 40. The identification unit 12E identifies a barycentric position g of fluorescence intensity values in the fluorescence signal 40 on the basis of the profile. The calculation unit 12F identifies a target barycentric position and calculates a movement amount and movement direction on the basis of the difference, Δg, between the barycentric position and the target barycentric position g'.

Here, the fluorescence intensity values of the fluorescence signal 40 are correlated with the intensity of the excitation light LB. Thus, the obtained fluorescence signal 40 has optical characteristics reflecting the asymmetry of the excitation light LB. Therefore, since the derivation unit 12B calculates the movement amount and the movement direction on the basis of the barycentric position g identified on the basis of the profile of fluorescence intensity values included in the fluorescence signal 40, it is possible to focus on the measurement-target region 22B.

Furthermore, the generation unit 12D generates the profile by using fluorescence intensity values in the fluorescence-receiving region E included in the fluorescence signal 40.

Since the profile is generated by using the fluorescence-receiving region E, which is a part of the fluorescence signal 40, instead of the entire fluorescence signal 40, the microscope system 1 can shorten the process time and simplify the processing in addition to the above-mentioned effect.

Furthermore, the irradiation unit 14 includes the light-blocking unit 14C that partially blocks the irradiation light LA projected from the light-emitting unit 14A to be output as the excitation light LB. Since the irradiation light LA is partially blocked by the light-blocking unit 14C to be rendered into the excitation light LB having an asymmetric shape with respect to the optical axis, it is possible to easily project the excitation light LB.

Furthermore, the detection unit 30 is formed by arraying a plurality of block regions 31A along the light-receiving surface 33, each block region 31A including a plurality of types of light-receiving units 31 that are different in at least one of gain or charge accumulation time. For example, a plurality of types of light-receiving units 31 that are different in at least one of gain or charge accumulation time may be arranged in a mosaic pattern in the block region 31A. In this case, it is possible to obtain an accurate fluorescence signal 40 for deriving the movement amount and the movement direction of at least one of the objective lens 20 or the measurement-target member 22 even in a case of using a sample S having any characteristics as the measurement target.

Furthermore, the focus adjustment device 12 of the present embodiment includes the acquisition unit 12A that acquires a fluorescence signal 40 from the detection unit 30 of the measurement unit 10, the derivation unit 12B, and the movement control unit 12C. The derivation unit 12B derives a movement amount and a movement direction of at least one of the objective lens 20 or the measurement-target member 22 focusing the objective lens 20 on the measurement-target region 22B on the basis of the fluorescence signal 40. The movement control unit 12C moves at least one of the objective lens 20 or the measurement-target member 22 by the derived movement amount in the derived movement direction.

As described, in the focus adjustment device 12 of the present embodiment, the fluorescence signal 40 is used to derive the movement amount and the movement direction of at least one of the objective lens 20 or the measurement-target member 22 and control movement thereof. Therefore, in the focus adjustment device 12 of the present embodiment, it is possible to easily focus on the measurement-target region 22B arranged across the glass (glass member 22A).

(Variation 1)

The above-described embodiment has been described by using an example in which the detection unit 30 and the image detecting unit 34 are separately provided. However, in a case where a CMOS image sensor or a CCD image sensor is used as the detection unit 30, the detection unit 30 and the image detecting unit 34 may be integrated.

Figure 12:
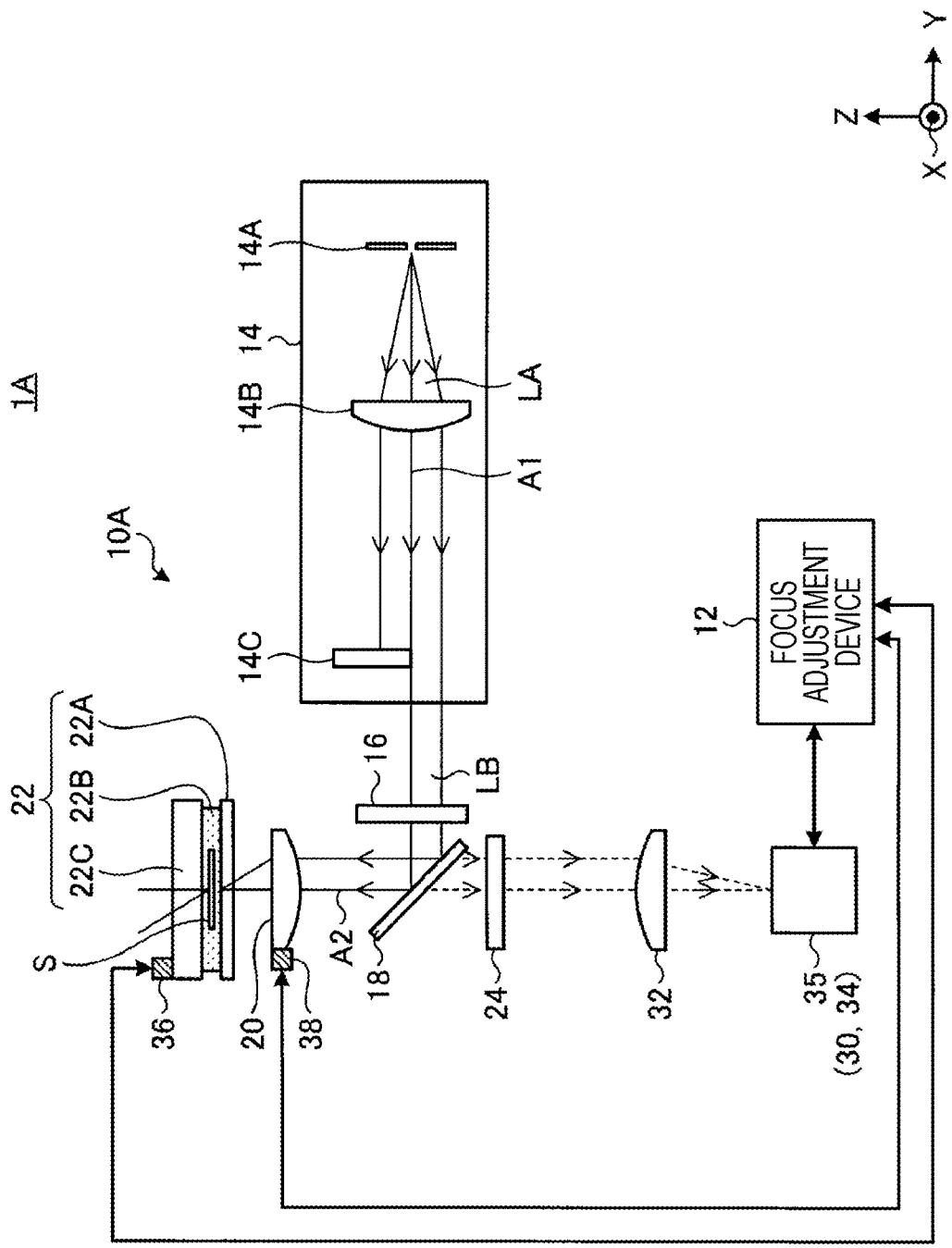
FIG. 12 is a schematic diagram showing an example of a microscope system according to Variation 1 of the present disclosure.

FIG. 12 is a schematic diagram showing an example of a microscope system 1A of the present variation. The microscope system 1A includes a measurement unit 10A and a focus adjustment device 12. The focus adjustment device 12 is similar to that of the above-described embodiment.

The measurement unit 10A includes a detection unit 35 instead of the detection unit 30 and the image detecting unit 34 of the above-described embodiment. That is, the measurement unit 10A is similar to the measurement unit 10 of the above-described embodiment except that it includes the detection unit 35 instead of the detection unit 30 and the image detecting unit 34 and does not include the half mirror 26 and the imaging lens 28 (see FIG. 1).

The detection unit 35 is used as both of the detection unit 30 and the image detecting unit 34. Thus, in this case, it is preferable to connect the detection unit 35 and the focus adjustment device 12 in a manner capable of sending/receiving data or signals. Furthermore, in this case, it is preferable to eliminate the half mirror 26 and the imaging lens 28.

By integrating the detection unit 30 and the image detecting unit 34 as described, it is possible to obtain an effect similar to that of the above-described embodiment and simplify the device configuration of the microscope system 1A.

(Variation 2) In above-described embodiment, the excitation light LB having an asymmetric shape with respect to the optical axis is projected by partially blocking the irradiation light LA by the light-blocking unit 14C. However, the method for realizing the excitation light LB is not limited to the above-described embodiment. For example, the excitation light LB may be realized by separating the irradiation light LA.

Figure 13:
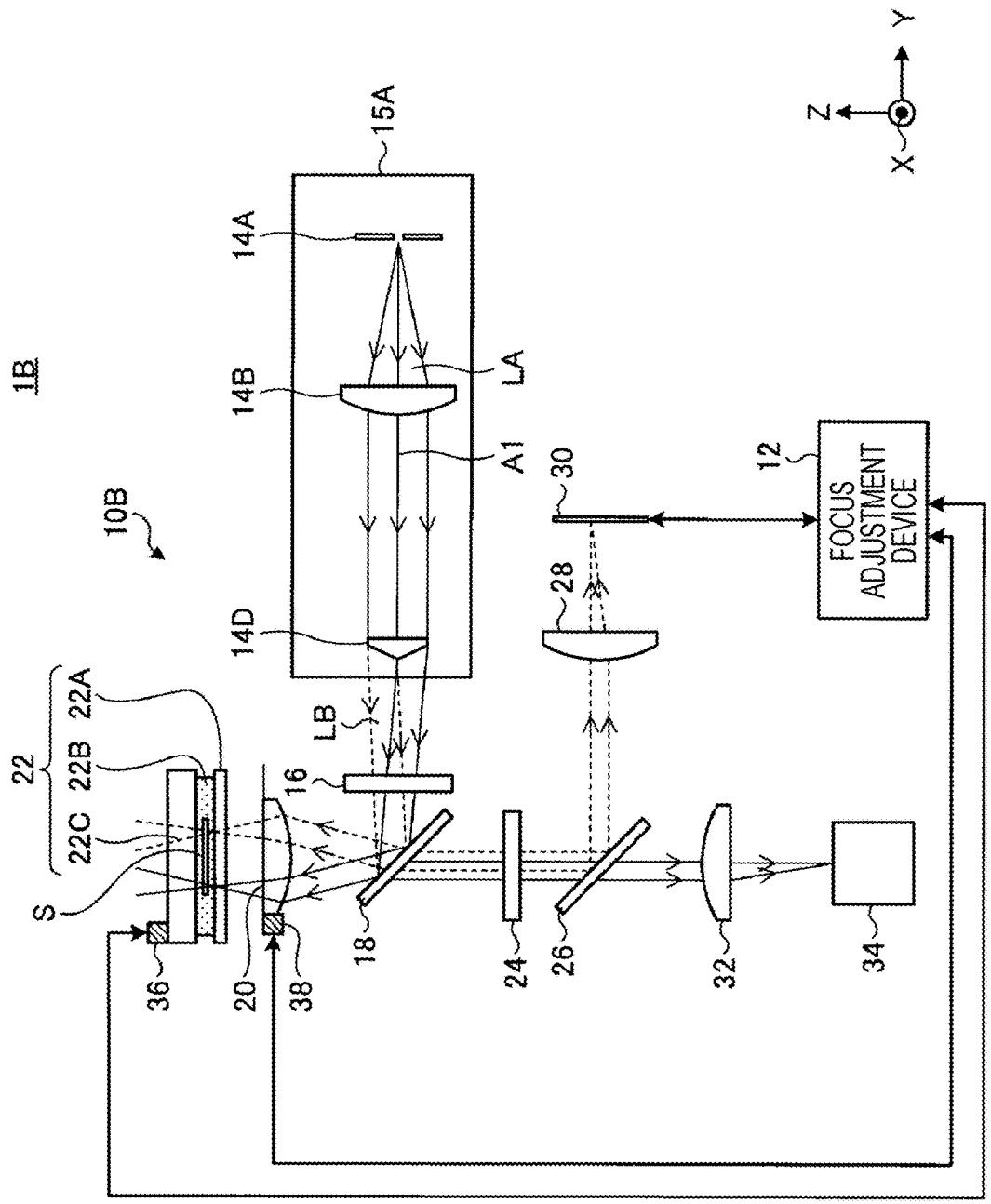
FIG. 13 is a schematic diagram showing an example of a microscope system according to Variation 2 of the present disclosure.

FIG. 13 is a schematic diagram showing an example of a microscope system 1B of the present variation. The microscope system 1B includes a measurement unit 10B and a focus adjustment device 12. The focus adjustment device 12 is similar to that of the above-described embodiment.

The measurement unit 10B is similar to the measurement unit 10 except that it includes an irradiation unit 15A instead of the irradiation unit 14 (see FIG. 1).

The irradiation unit 15A includes a light-emitting unit 14A, a collimating lens 14B, and a separation unit 14D. The light-emitting unit 14A and the collimating lens 14B are similar to those of the above-described embodiment. Note that, in the present variation, it is assumed that the light-emitting unit 14A emits line-shaped irradiation light LA that is longer in the X-axis direction.

The separation unit 14D separates the irradiation light LA projected from the light-emitting unit 14A into an asymmetric shape with respect to the optical axis. Specifically, the separation unit 14D outputs, as excitation light LB, one of two light pencils into which the irradiation light LA is separated at the peak of the Gaussian distribution of the irradiation light LA as the boundary. The separation unit 14D is a triangular prism, for example. The separation unit 14D may be arranged in advance at a position such that the irradiation light LA is separated into two at the peak of the Gaussian distribution of the irradiation light LA as the boundary.

In this case, in the measurement unit 10B, the excitation light LB, which is one of the light pencils into which the irradiation light LA is separated by the separation unit 14D, may be projected onto the measurement-target region 22B, so that fluorescence generated in the measurement-target region 22B by the projection is received by the detection unit 30. Furthermore, the other light pencil of the irradiation light LA may also be projected onto the measurement-target region 22B, so that fluorescence generated in the measurement-target region 22B by the projection is received by the image detecting unit 34.

As described, in the present variation, the irradiation unit 15A includes the separation unit 14D. The separation unit 14D separates the irradiation light LA projected from the light-emitting unit 14A into an asymmetric shape with respect to the optical axis to be output as the excitation light LB.

Thus, in the microscope system 1B of the present variation, it is possible to separate the irradiation light LA projected from the irradiation unit 15A without wasting part of it, and use one light pencil as the excitation light LB for the detection unit 30 and use the other light pencil as a light pencil for the image detecting unit 34.

(Variation 3) In the present variation, a configuration in which excitation light LB having an asymmetric shape is realized without using the light-blocking unit 14C or the separation unit 14D will be described.

Figure 14:
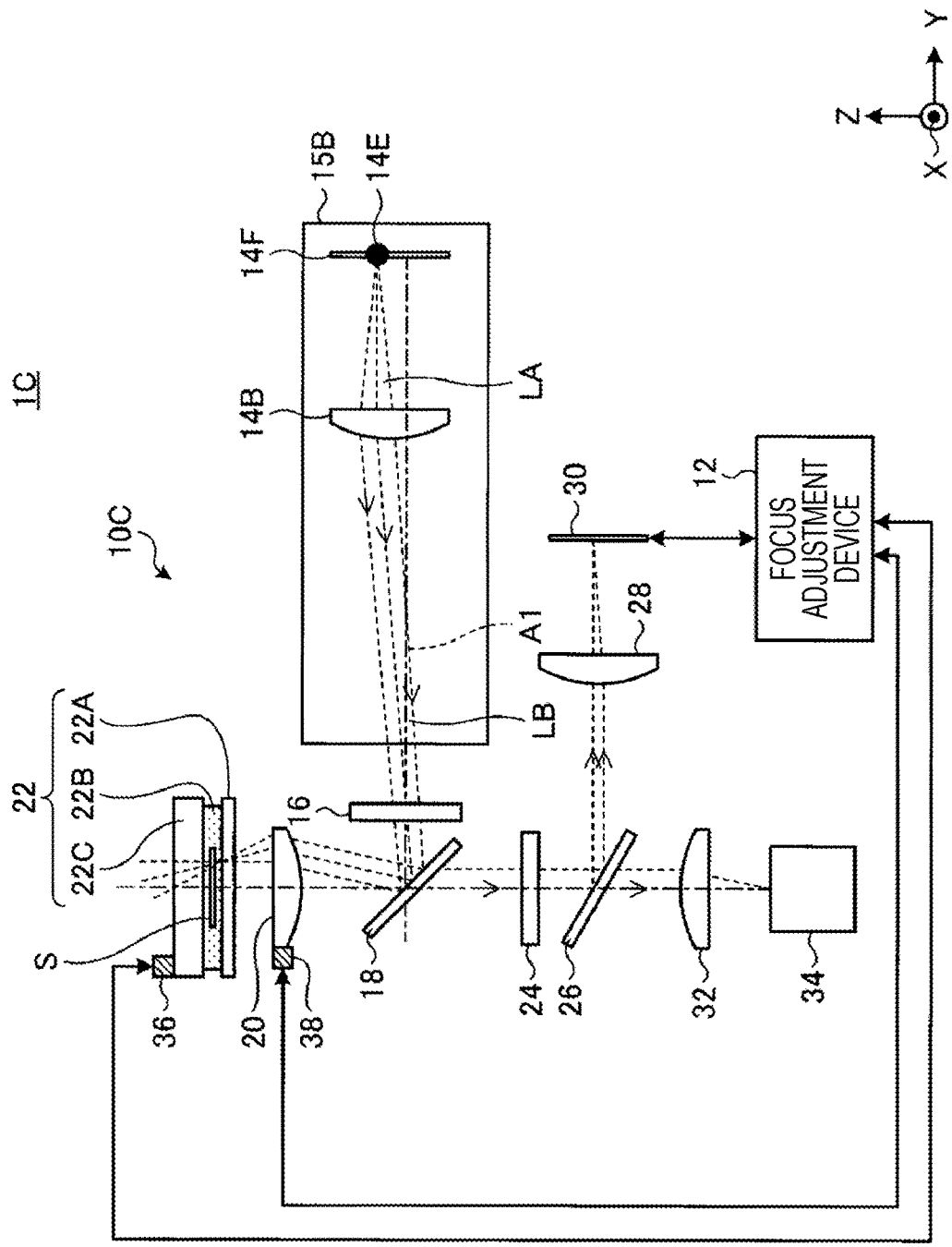
FIG. 14 is a schematic diagram showing an example of a microscope system according to Variation 3 of the present disclosure.

FIG. 14 is a schematic diagram showing an example of a microscope system 1C of the present variation. The microscope system 1C includes a measurement unit 10C and a focus adjustment device 12. The focus adjustment device 12 is similar to that of the above-described embodiment.

The measurement unit 10C is similar to the measurement unit 10 except that it includes an irradiation unit 15B instead of the irradiation unit 14 (see FIG. 1).

The irradiation unit 15B includes a light-emitting unit 14F and a collimating lens 14B. The collimating lens 14B is similar to that of the above-described embodiment.

As with the light-emitting unit 14A of the above-described embodiment, the light-emitting unit 14F emits irradiation light LA that includes a wavelength range in which the sample S emits fluorescence. The light-emitting unit 14F may be any of a light source that emits spot-shaped (point-shaped) light, a light source that emits line-shaped light, a light source that emits line-shaped light through a slit or the like.

In the present variation, a light-emitting position 14E at which the light-emitting unit 14F emits light is arranged at a position deviating from the optical axis A1 of the collimating lens 14B. That is, the arrangement of the light-emitting position 14E and the collimating lens 14B is adjusted in advance so as to achieve a positional relationship in which the light-emitting position 14E, which is the aperture stop of the light-emitting unit 14F, is out of the focal position of the collimating lens 14B. Thus, the collimating lens 14B forms an optical system that is non-telecentric with respect to the light-emitting position 14E.

As described, in the present variation, the irradiation unit 15B includes the collimating lens 14B that partially collimates the irradiation light LA projected from the light-emitting unit 14F to be output as the excitation light LB. In addition, the light-emitting position 14E of the light-emitting unit 14F is arranged at a position deviating from the optical axis A1 of the collimating lens 14B.

Thus, in the present variation, it is possible to realize the excitation light LB having an asymmetric shape with respect to the optical axis without using the light-blocking unit 14C or the separation unit 14D.

(Variation 4)

Note that the configuration for realizing the excitation light LB having an asymmetric shape with respect to the optical axis realized in the above-described embodiment and the above-described variations may be realized in a space between the light source that emits the irradiation light LA and the position at which the output of the irradiation light LA to the measurement unit 10 starts. That is, the excitation light LB may be emitted from an optical member that emits excitation light LB having an asymmetric shape so that it is projected into each of the measurement unit 10, the measurement unit 10A, the measurement unit 10B, and the measurement unit 10C.

Second Embodiment

In the present embodiment, a form in which excitation light LB in which astigmatism is generated is used as excitation light LB having an asymmetric shape with respect to the optical axis will be described.

Note that a microscope system 1D of the present embodiment is similar to the microscope system 1 of the first embodiment (see FIG. 1). However, the microscope system 1D includes an irradiation unit 17 instead of the irradiation unit 14. Furthermore, the microscope system 1D includes a focus adjustment device 13 instead of the focus adjustment device 12. The focus adjustment device 13 is an example of an information processing device.

As with the irradiation unit 14 of the first embodiment, the irradiation unit 17 projects excitation light LB having an asymmetric shape with respect to the optical axis. However, the irradiation unit 17 projects the excitation light LB by generating astigmatism in irradiation light LA projected from the light-emitting unit 14A that emits spot-shaped irradiation light LA.

A known method may be used to generate astigmatism. For example, the irradiation unit 14 may be configured such that the light-blocking unit 14C is not provided and an astigmatism lens is arranged on the light-emitting side of the collimating lens 14B. The astigmatism lens is a lens that has a plurality of focal distances to generate astigmatism. The astigmatism lens is formed by adding a cylindrical lens to a normal objective lens, for example.

Thus, in the present embodiment excitation light LB having astigmatism is projected from the irradiation unit 17 toward the measurement-target region 22B.

As with the focus adjustment device 12 of the first embodiment, the focus adjustment device 13 adjusts the focus of the objective lens 20 on the basis of a fluorescence signal 40 acquired from the detection unit 30. The focus adjustment device 13 and the detection unit 30, the first driving unit 36, and the second driving unit 38 are connected in a manner capable of sending/receiving data or signals.

Figure 15:
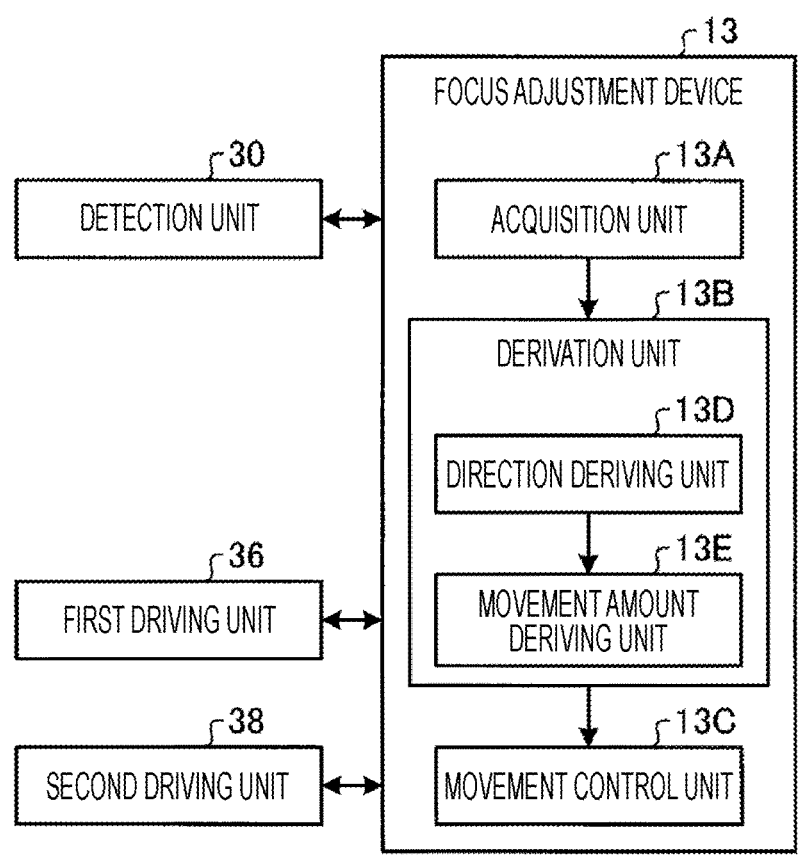
FIG. 15 is a diagram showing an example of the functional configuration of a focus adjustment device according to a second embodiment of the present disclosure.

FIG. 15 is a diagram showing an example of the functional configuration of the focus adjustment device 13. Note that FIG. 15 also shows the detection unit 30, the first driving unit 36, and the second driving unit 38 for the sake of description.

The focus adjustment device 13 includes an acquisition unit 13A, a derivation unit 13B, and a movement control unit 13C. The derivation unit 13B includes a direction deriving unit 13D and a movement amount deriving unit 13E.

For example, some or all of the acquisition unit 13A, the derivation unit 13B, the movement control unit 13C, the direction deriving unit 13D, and the movement amount deriving unit 13E may be realized by causing a processing device such as a CPU to execute programs, that is, by software, may be realized by hardware such as an IC, or may be realized by using software and hardware in conjunction. The movement control unit 13C is similar to the movement control unit 12C.

The acquisition unit 13A acquires a fluorescence signal 40 from the detection unit 30.

The derivation unit 13B derives a movement amount and a movement direction of at least one of the objective lens 20 or the measurement-target member 22 focusing the objective lens 20 on the measurement-target region 22B on the basis of the fluorescence signal 40 acquired from the detection unit 30.

In the present embodiment, the derivation unit 13B includes the direction deriving unit 13D and the movement amount deriving unit 13E.

Here, in the present embodiment, the excitation light LB projected onto the measurement-target member 22 has astigmatism. Furthermore, the fluorescence intensity values of the fluorescence signal 40 are correlated with the intensity of the excitation light LB. Thus, the fluorescence signal 40 obtained in the present embodiment has optical characteristics reflecting the asymmetry of the excitation light LB due to its astigmatism.

Furthermore, the direction of occurrence of blurring due to variation in the distance between the objective lens 20 and the measurement-target member 22 in the fluorescence-receiving region E included in the fluorescence signal 40 reflecting the asymmetry of the excitation light LB due to its astigmatism exhibits a behavior different from that in the above-described embodiment and variations.

Figure 16:
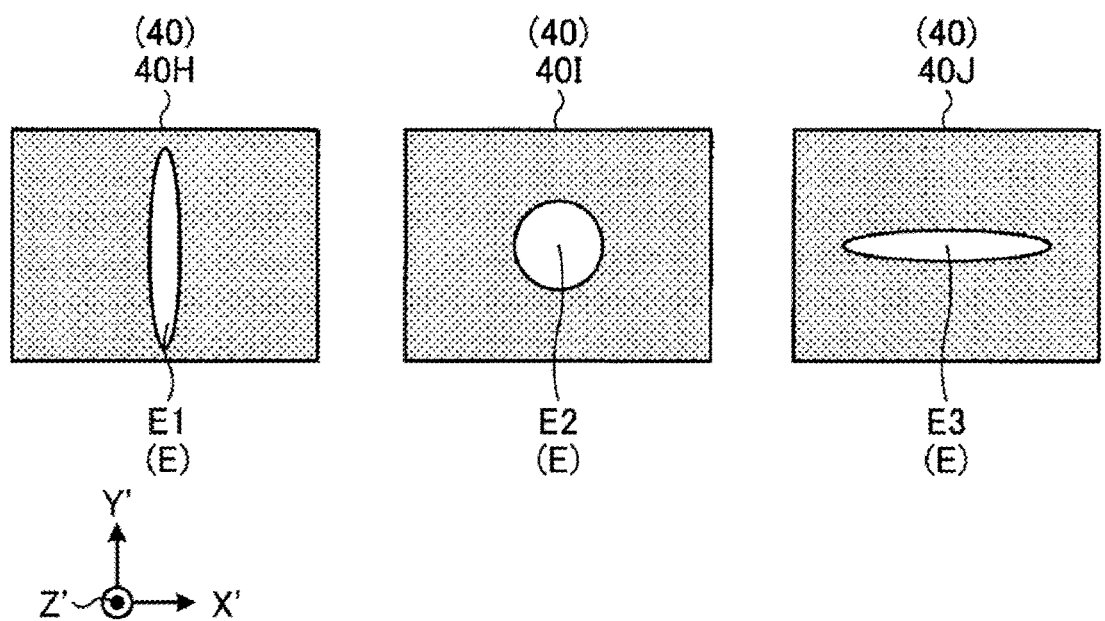
FIG. 16 is a schematic diagram showing an example of fluorescence signals according to the second embodiment of the present disclosure.

FIG. 16 is a schematic diagram showing an example of fluorescence signals 40 obtained in the present embodiment. The fluorescence signals 40 include a fluorescence-receiving region E.

FIG. 16 shows fluorescence signals 40 obtained by the detection unit 30 in respective steps of changing the distance between the measurement-target member 22 and the objective lens 20 from a short distance to a long distance in a stepwise manner. The plurality of fluorescence signals (a fluorescence signal 40H, a fluorescence signal 40I, and a fluorescence signal 40J) shown in FIG. 16 is an example of fluorescence signals 40 detected in respective steps of increasing the distance between the measurement-target member 22 and the objective lens 20 in a stepwise manner from the fluorescence signal 40H toward the fluorescence signal 40J. Furthermore, the fluorescence signal 40I is an example of a fluorescence signal 40 when the objective lens 20 is focused on the measurement-target region 22B.

Furthermore, the vertical-axis direction (Y'-axis direction) of the fluorescence signals 40 shown in FIG. 16 corresponds to the Y-axis direction on the measurement-target member 22. Furthermore, the horizontal-axis direction (X'-axis direction) of the fluorescence signals 40 shown in FIG. 16 corresponds to the X-axis direction on the measurement-target member 22. Furthermore, the Z'-axis direction of the fluorescence signals 40 shown in FIG. 16 corresponds to the Z-axis direction, which is a direction in which the measurement-target member 22 and the objective lens 20 moves toward or away from each other.

As shown by the fluorescence signal 40H, the fluorescence signal 40I, and the fluorescence signal 40J, the spread direction of the fluorescence-receiving region E depends on whether the distance between the measurement-target member 22 and the objective lens 20 is shorter or longer than a distance when the focus is on. Specifically, in a case where the focus is placed on the measurement-target region 22B, as shown by the fluorescence signal 40I, the shape of the fluorescence-receiving region E included in the fluorescence signal 40I becomes substantially circular.

On the other hand, in a case where the distance between the measurement-target member 22 and the objective lens 20 is shorter than that in the focused state, the fluorescence-receiving region E has a shape that spreads in the Y'-axis direction as shown by the fluorescence signal 40H, for example. Furthermore, in a case where the distance between the measurement-target member 22 and the objective lens 20 is longer than that in the focused state, the fluorescence-receiving region E has a shape that spreads in the X'-axis direction as shown by the fluorescence signal 40J, for example.

Thus, the derivation unit 13B divides the fluorescence signal 40 into a plurality of regions according to the spread direction of the fluorescence-receiving region E included in the fluorescence signal 40. Then, the movement direction and the movement amount are derived by using fluorescence intensity values in each divided region.

Figure 17:
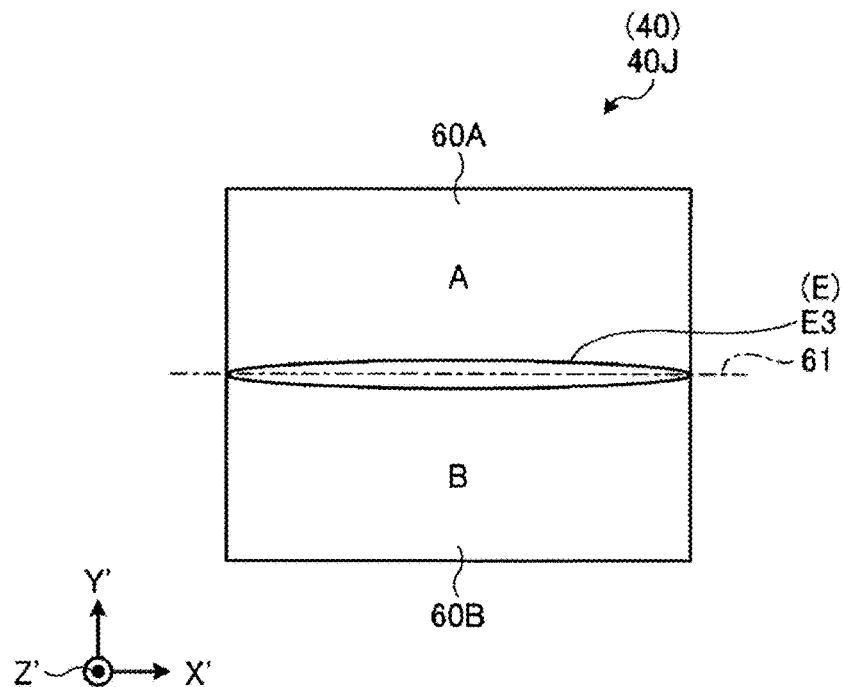
FIG. 17 is an illustrative diagram showing an example of derivation of a movement direction and a movement amount according to the second embodiment of the present disclosure.

FIG. 17 is an illustrative diagram showing an example of derivation of the movement direction and the movement amount. For example, it is assumed that the acquisition unit 13A has acquired the fluorescence signal 40J shown in FIG. 17. In this case, the direction deriving unit 13D derives the movement direction of at least one of the objective lens 20 or the measurement-target member 22 on the basis of the spread direction of a fluorescence-receiving region E3 included in the fluorescence signal 40J.

Specifically, the direction deriving unit 13D stores in advance first management information in which the spread direction of the fluorescence-receiving region E3 included in the fluorescence signal 40J and the movement direction for bringing the fluorescence-receiving region E3 exhibiting a shape spread in the spread direction into a state of the fluorescence signal 40I (see FIG. 16) including a fluorescence-receiving region E2 in the focused state are associated to each other. This movement direction is only required to be a movement direction of at least one of the objective lens 20 or the measurement-target member 22. In the description of the present embodiment, it is assumed that it is a movement direction of the objective lens 20.

Then, the direction deriving unit 13D can derive the movement direction of the objective lens 20 by reading a movement direction corresponding to the spread direction of the fluorescence-receiving region E included in the fluorescence signal 40J acquired by the acquisition unit 13A in the first management information. Note that the direction deriving unit 13D may store in advance a function indicating the relationship indicated by the first management information mentioned above and derive the movement direction by using the function.

The movement amount deriving unit 13E sets a boundary in the fluorescence signal 40J acquired by the acquisition unit 13A. Specifically, the movement amount deriving unit 13E sets, as the boundary, a straight line 61 passing through the fluorescence-receiving region E3 included in the fluorescence signal 40J and along the spread direction of the fluorescence-receiving region E3 (X'-axis direction in FIG. 17). Then, the movement amount deriving unit 13E divides the fluorescence signal 40J into two regions (a region 60A and a region 60B) at the straight line 61 as the boundary.

Then, the movement amount deriving unit 13E calculates a total value of respective fluorescence intensity values of pixels included in each of the region 60A and the region 60B. Then, the movement amount deriving unit 13E derives, as the movement amount of the objective lens 20, a ratio of the difference between the total values of fluorescence intensity values of respective ones of the two regions 60A and 60B with respect to a total value of fluorescence intensity values included in the fluorescence signal 40J.

That is, the movement amount deriving unit 13E derives the movement amount by using equation (2) below.

$$\text{movement amount} = (\Sigma A - \Sigma B)/(\Sigma A + \Sigma B) \qquad \text{equation (2)}$$

In equation (2), $\Sigma A$ indicates the total value of the respective fluorescence intensity values of the pixels included in the region 60A. In equation (2), $\Sigma B$ indicates the total value of the respective fluorescence intensity values of the pixels included in the region 60B.

Thus, the derivation unit 13B can derive the movement direction and the movement amount of at least one of the objective lens 20 or the measurement-target member 22 by using the fluorescence signal 40 acquired from the detection unit 30 including at least two light-receiving units 31.

Note that the derivation unit 13B may derive the movement direction and the movement amount of at least one of the objective lens 20 or the measurement-target member 22 by using another method.

Figure 18:
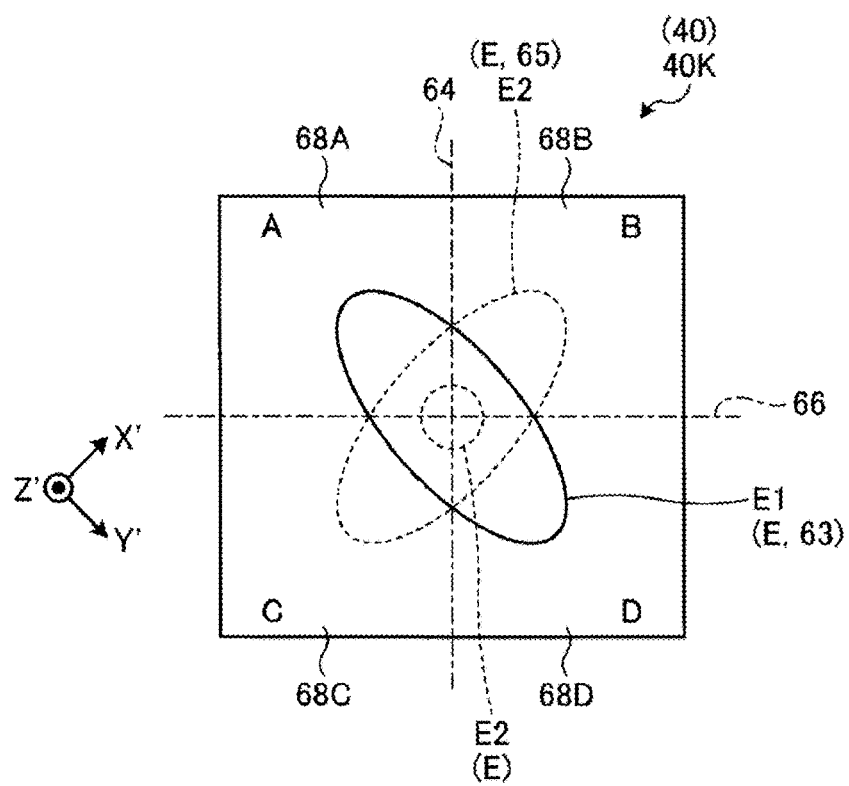
FIG. 18 is an illustrative diagram showing an example of derivation of a movement direction and a movement amount according to the second embodiment of the present disclosure.

FIG. 18 is an illustrative diagram showing another example of derivation of the movement direction and the movement amount. For example, it is assumed that the acquisition unit 13A has acquired a fluorescence signal 40K shown in FIG. 18. The fluorescence signal 40K is assumed to include a fluorescence-receiving region E2. Note that, for the sake of description, the fluorescence-receiving region E2 and the fluorescence-receiving region E3 are also indicated on the fluorescence signal 40K (see FIG. 16).

In this case, the direction deriving unit 13D divides the fluorescence signal 40K into four regions (a region 68A, a region 68B, a region 68C, and a region 68D). Specifically, the direction deriving unit 13D identifies each of one end portion of a first linear region 63, the other end portion of the first linear region 63, one end portion of a second linear region 65, and the other end portion of the second linear region 65 on the fluorescence signal 40K.

The first linear region 63 is a linear region exhibiting spread of the fluorescence-receiving region E1 when the distance between the objective lens 20 and the measurement-target member 22 decreases. The second linear region 65 is a linear region exhibiting spread of the fluorescence-receiving region E1 when the distance between the objective lens 20 and the measurement-target member 22 increases. A linear region refers to a region that is longer in the spread direction of the fluorescence-receiving region E. The direction deriving unit 13D may store in advance the position and range of each of the first linear region 63 and the second linear region 65 on the fluorescence signal 40.

Then, the direction deriving unit 13D divides the fluorescence signal 40 into four regions (a region 68A, a region 68B, a region 68C, and a region 68D) such that the four identified end portions are each arranged in a different region.

Note that the direction deriving unit 13D may arrange a straight line along the longitudinal direction of the first linear region 63 and a straight line along the longitudinal direction of the second linear region 65 on the fluorescence signal 40K such that the intersection of these two straight lines is located on the fluorescence-receiving region E2. Then, the direction deriving unit 13D may set lines obtained by rotating these two straight lines by 45° about the fluorescence-receiving region E2 as boundaries (a boundary 64 and a boundary 66). Then, the direction deriving unit 13D may divide the fluorescence signal 40K into four regions (a region 68A, a region 68B, a region 68C, and a region 68D) by these boundaries 64 and 66.

Then, the direction deriving unit 13D identifies, as presence regions of the fluorescence-receiving region E2, two regions (the region 68A and the region 68D in FIG. 18) in which both spread-direction end portions of the fluorescence-receiving region E2 included in the fluorescence signal 40K acquired from the detection unit 30 are located out of the four regions (68A, the region 68B, the region 68C, and the region 68D) of the fluorescence signal 40K.

Then, the direction deriving unit 13D can derive the movement direction according to the positional relationship of the identified presence regions in the fluorescence signal 40K.

As described by using FIG. 16, the spread direction of the fluorescence-receiving region E depends on whether the distance between the measurement-target member 22 and the objective lens 20 is shorter or longer than a distance in the focused state.

Thus, the direction deriving unit 13D stores in advance second management information in which the positional relationship of the identified presence regions in the fluorescence signal 40K and the movement direction for reaching the focused state are associated with each other. This movement direction is only required to be a movement direction of at least one of the objective lens 20 or the measurement-target member 22. In the description of the present embodiment, it is assumed that it is a movement direction of the objective lens 20.

Then, the direction deriving unit 13D can derive the movement direction of the objective lens 20 by reading a movement direction corresponding to the positional relationship of the identified presence regions from the second management information. Note that the direction deriving unit 13D may store in advance a function indicating the relationship indicated by the second management information mentioned above and derive the movement direction by using the function.

Then, the movement amount deriving unit 13E derives, as the movement amount, a ratio of the difference obtained by subtracting a total value of fluorescence intensity values of the regions (the region 68B and the region 68C) other than the presence regions of the fluorescence-receiving region E2 out of the four regions (the region 68A, the region 68B, the region 68C, and the region 68D) from a total value of the presence regions (the region 68A and the region 68D) out of the four regions with respect to a total value of fluorescence intensity values included in the fluorescence signal 40K.

That is, the movement amount deriving unit 13E derives the movement amount by using equation (3) below.

$$\text{movement amount} = \{(\Sigma A + \Sigma B) - (\Sigma B + \Sigma C)\} / (\Sigma A + \Sigma B + \Sigma C + \Sigma D) \quad \text{equation (3)}$$

In equation (3), $\Sigma A$ indicates the total value of the respective fluorescence intensity values of the pixels included in the region 68A. In equation (3), $\Sigma B$ indicates the total value of the respective fluorescence intensity values of the pixels included in the region 68B. In equation (3), $\Sigma C$ indicates the total value of the respective fluorescence intensity values of the pixels included in the region 68C. In equation (3), $\Sigma D$ indicates the total value of the respective fluorescence intensity values of the pixels included in the region 68D.

Thus, the derivation unit 13B can derive the movement direction and the movement amount of at least one of the objective lens 20 or the measurement-target member 22 by using the fluorescence signal 40 acquired from the detection unit 30 including at least four light-receiving units 31.

Next, an example of a flow of information processing performed by the focus adjustment device 13 of the present embodiment will be described.

Figure 19:
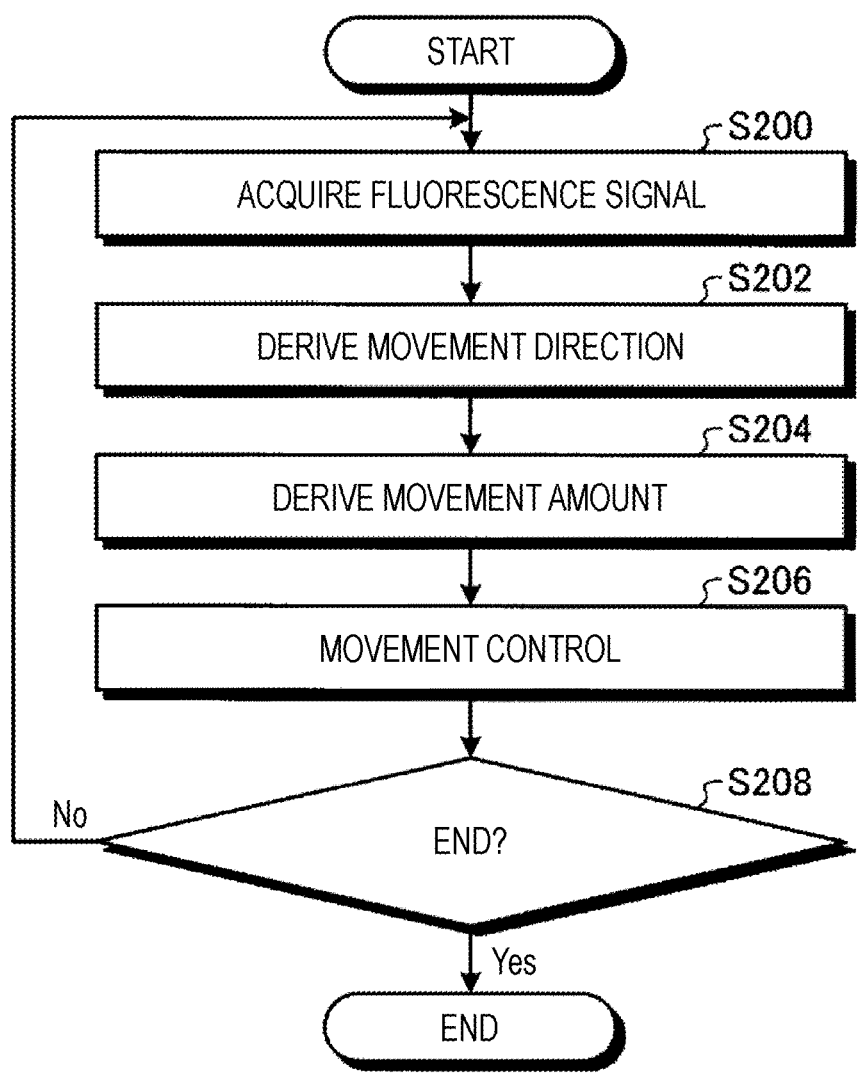
FIG. 19 is a flow chart showing an example of a flow of information processing according to the second embodiment of the present disclosure.

FIG. 19 is a flow chart showing an example of a flow of information processing.

The acquisition unit 13A acquires a fluorescence signal 40 from the detection unit 30 (step S200).

Next, the direction deriving unit 13D derives a movement direction by using the fluorescence signal 40 acquired in step S200 (step S202).

Next, the movement amount deriving unit 13E derives a movement amount by using the fluorescence signal 40 acquired in step S200 (step S204).

Next, the movement control unit 13C moves at least one of the objective lens 20 or the measurement-target member 22 by the movement amount in the movement direction derived in step S202 and step S204 (step S206). Thus, the positions of the objective lens 20 and the measurement-target member 22 are adjusted such that the objective lens 20 is focused on the measurement-target region 22B of the measurement-target member 22.

Next, the focus adjustment device 12 determines whether or not to end the information processing (step S208). The determination in step S208 is similar to that in step S112 of the first embodiment (see FIG. 9). When the determination is negative in step S208 (step S208: No), return to step S200 above. When the determination is positive in step S208 (step S208: Yes), this routine ends.

As described above, the irradiation unit 17 of the microscope system 1D of the present embodiment projects the excitation light LB in which astigmatism is generated in the irradiation light LA projected from the light-emitting unit 14A. Thus, the excitation light LB in which astigmatism is generated may be used as the excitation light LB having an asymmetric shape with respect to the optical axis.

In this case as well, in the microscope system 1D, the excitation light LB having an asymmetric shape is concentrated at the measurement-target member 22, and the fluorescence signal 40 indicating the fluorescence intensity values of fluorescence emitted from the measurement-target region 22B is output. In addition, in the microscope system 1D, the fluorescence signal 40 is used to derive the movement amount and the movement direction of at least one of the objective lens 20 or the measurement-target member 22 and control movement thereof.

Therefore, in the microscope system 1D of the present embodiment, it is possible to easily focus on the measurement-target region 22B arranged across the glass (glass member 22A).

Furthermore, the derivation unit 13B includes the direction deriving unit 13D and the movement amount deriving unit 13E. The direction deriving unit 13D derives the movement direction on the basis of the spread direction of the fluorescence-receiving region E included in the fluorescence signal 40. The movement amount deriving unit 13E divides the fluorescence signal 40 into two regions (the region 60A and the region 60B) at the straight line 61 passing through the fluorescence-receiving region E and along the spread direction of the fluorescence-receiving region E as the boundary, and derives, as the movement amount, the ratio of the difference between the total values of fluorescence intensity values of respective ones of the two regions (the region 60A and the region 60B) with respect to the total value of fluorescence intensity values included in the fluorescence signal 40.

Thus, in the microscope system 1D of the present embodiment, it is possible to easily focus on the measurement-target region 22B arranged across the glass (glass member 22A) by acquiring the fluorescence signal 40 from the detection unit 30 including at least two light-receiving units 31.

Furthermore, the direction deriving unit 13D divides the fluorescence signal 40 into four regions (the region 68A, the region 68B, the region 68C, and the region 68D) such that one end portion of the first linear region 63 exhibiting spread of the fluorescence-receiving region E when the distance between the objective lens 20 and the measurement-target member 22 decreases, the other end portion of the first linear region 63, one end portion of the second linear region 65 exhibiting spread of the fluorescence-receiving region E when the distance between the objective lens 20 and the measurement-target member 22 increases, and the other end portion of the second linear region 65 are each arranged in a different region.

Then, the direction deriving unit 13D derives the movement direction according to presence regions (the region 68A and the region 68D) that are two regions in which both spread-direction end portions of the fluorescence-receiving region E included in the fluorescence signal 40 acquired from the detection unit 30 are located out of the four regions (the region 68A, the region 68B, the region 68C, and the region 68D). Furthermore, the movement amount deriving unit 13E derives, as the movement amount, a ratio of the difference obtained by subtracting a total value of fluorescence intensity values of the two regions (the region 68B and the region 68C) other than the presence regions out of the four regions (the region 68A, the region 68B, the region 68C, and the region 68D) from a total value of fluorescence intensity values of the presence regions (the region 68A and the region 68D) out of the four regions with respect to a total value of fluorescence intensity values included in the fluorescence signal 40.

Thus, in the microscope system 1D of the present embodiment, it is possible to easily focus on the measurement-target region 22B arranged across the glass (glass member 22A) by acquiring the fluorescence signal 40 from the detection unit 30 including at least four light-receiving units 31.

Third Embodiment

In the present embodiment, a form in which the barycentric position is identified by using a fluorescence signal 40 from light-receiving units 31 having particular exposure values will be described. Note that portions having the same functions or configurations as those in the above-described embodiment may be given the same reference numerals and detailed descriptions may be omitted.

A microscope system 1E of the present embodiment is similar to the microscope system 1 of the first embodiment (see FIG. 1). However, the microscope system 1E includes a detection unit 39 instead of the detection unit 30. Furthermore, the microscope system 1E includes a focus adjustment device 19 instead of the focus adjustment device 12. The focus adjustment device 19 is an example of an information processing device.

Note that it is assumed that the light-emitting unit 14A is a light source that emits line-shaped irradiation light LA as in the first embodiment. Furthermore, in the description of the present embodiment, an example is used in which the longitudinal direction of the line-shaped irradiation light LA coincides with the X-axis direction in FIG. 1 as in the first embodiment.

Figure 20:
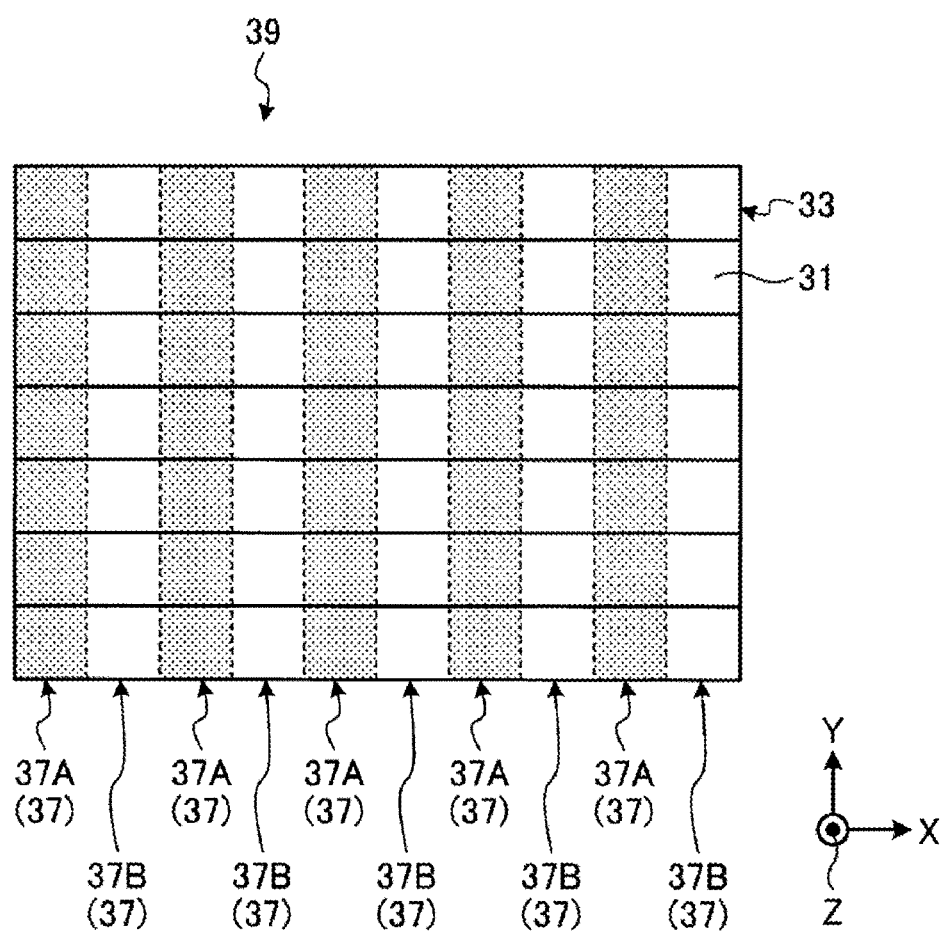
FIG. 20 is a schematic diagram showing an example of a detection unit according to a third embodiment of the present disclosure.

FIG. 20 is a schematic diagram showing an example of the detection unit 39. On the other hand, the detection unit 39 includes a plurality of light-receiving units 31, receives fluorescence emitted from the measurement-target region 22B, and outputs a fluorescence signal 40, as with the detection unit 30 of the first embodiment.

Specifically, the detection unit 39 includes a plurality of light-receiving units 31. The plurality of light-receiving units 31 is two-dimensionally arrayed along a light-receiving surface 33 on which fluorescence is received. Note that the detection unit 39 may be in a form in which the plurality of light-receiving units 31 is one-dimensionally arrayed along the light-receiving surface 33. Furthermore, the detection unit 39 is only required to include at least two light-receiving units 31.

The present embodiment will be described by using an example in which the detection unit 39 is in a form in which the plurality of light-receiving units 31 is two-dimensionally arrayed along the light-receiving surface 33.

The detection unit 39 has a configuration in which a plurality of unitary regions 37 of a plurality of types is arrayed along the light-receiving surface 33. Each of the plurality of types of unitary regions 37 includes one or more light-receiving units 31. In the plurality of types of unitary regions 37, the included light-receiving units 31 have exposure values different from each other.

An exposure value refers to at least one of a gain or a charge accumulation time. That is, the plurality of types of unitary regions 37 is regions in which the included light-receiving units 31 are different from each other in at least one of gain or charge accumulation time. The definitions of gain and charge accumulation time have been described in the first embodiment, and thus the description thereof will be omitted here. Note that a plurality of light-receiving units 31 included in one unitary region 37 has the same exposure value as each other.

A predetermined exposure value may be set for each of the plurality of light-receiving units 31 according to the type of the unitary region 37 to which the light-receiving unit 31 belongs. Thus, light-receiving units 31 whose exposure value can be set to any value may be used as the light-receiving units 31.

In FIG. 20, a form in which the detection unit 39 has a configuration in which a unitary region 37A and a unitary region 37B are alternately arrayed as two types of unitary regions 37 is shown as an example. The unitary region 37A and the unitary region 37B are unitary regions 37 having types different from each other. For example, a high exposure value is preset for the light-receiving units 31 included in the unitary region 37A. A high exposure value means that at least one of a gain or a charge accumulation time is greater than or equal to a threshold. Furthermore, a low exposure value is preset for the light-receiving units 31 included in the unitary region 37B. A low exposure value means that at least one of a gain or a charge accumulation time is less than a threshold. The threshold may be preset.

Note that the detection unit 39 may have a configuration in which three or more types of unitary regions 37 having exposure values different from each other are arrayed and is not limited to two types of unitary regions 37.

The detection unit 39 receives fluorescence and outputs a fluorescence signal 40. The fluorescence signal 40 output from the detection unit 39 is a signal indicating intensity values of fluorescence received by respective ones of the plurality of light-receiving units 31, as with the fluorescence signal 40 described in the above-described embodiment. That is, the fluorescence signal 40 is a signal that defines fluorescence intensity values of respective ones of the plurality of light-receiving units 31. The detection unit 39 outputs the fluorescence signal 40 to the focus adjustment device 19.

Figure 21:
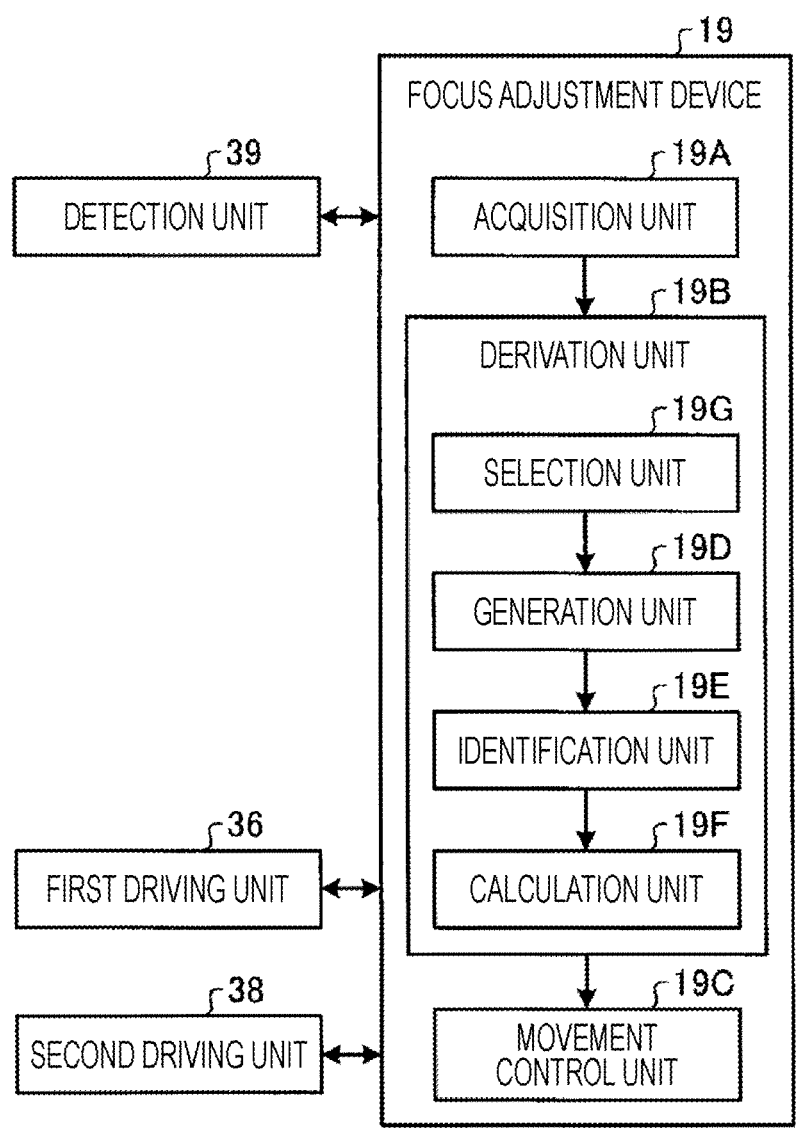
FIG. 21 is a diagram showing an example of the functional configuration of a focus adjustment device according to a third embodiment of the present disclosure.

FIG. 21 is a diagram showing an example of the functional configuration of the focus adjustment device 19. Note that FIG. 21 also shows the detection unit 39, the first driving unit 36, and the second driving unit 38 for the sake of description.

As with the focus adjustment device 12 of the first embodiment, the focus adjustment device 19 adjusts the focus of the objective lens 20 on the basis of a fluorescence signal 40 acquired from the detection unit 39. The focus adjustment device 19 and the detection unit 39, the first driving unit 36, and the second driving unit 38 are connected in a manner capable of sending/receiving data or signals.

The focus adjustment device 19 includes an acquisition unit 19A, a derivation unit 19B, and a movement control unit 19C. The derivation unit 19B includes a selection unit 19G, a generation unit 19D, an identification unit 19E, and a calculation unit 19F.

For example, some or all of the acquisition unit 19A, the derivation unit 19B, the movement control unit 19C, the selection unit 19G, the generation unit 19D, the identification unit 19E, and the calculation unit 19F may be realized by causing a processing device such as a CPU to execute programs, that is, by software, may be realized by hardware such as an IC, or may be realized by using software and hardware in conjunction. The movement control unit 19C is similar to the movement control unit 12C.

The acquisition unit 19A acquires a fluorescence signal 40 from the detection unit 39.

The derivation unit 19B derives a movement amount and a movement direction of at least one of the objective lens 20 or the measurement-target member 22 on the basis of the fluorescence signal 40 acquired from the detection unit 39. Specifically, the derivation unit 19B derives the above-mentioned movement amount and the above-mentioned movement direction for focusing the objective lens 20 on the measurement-target region 22B on the basis of the fluorescence signal 40.

In the present embodiment, the derivation unit 19B includes the selection unit 19G, the generation unit 19D, the identification unit 19E, and the calculation unit 19F.

The selection unit 19G selects a unitary region 37 including light-receiving units 31 for which a particular exposure value is set from the plurality of types of unitary regions 37.

Figure 22A:
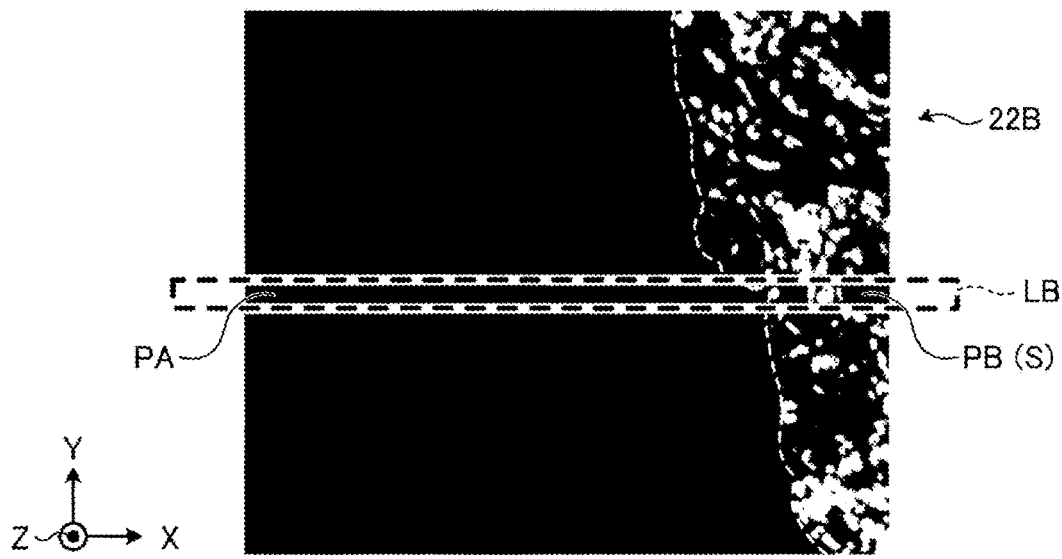
FIG. 22A is a conceptual diagram of a measurement-target region according to the third embodiment of the present disclosure.

FIG. 22A is a conceptual diagram of the measurement-target region 22B of the sample S. Line-shaped irradiation light LA is rendered into an asymmetric shape with respect to the optical axis A1 and is projected onto the measurement-target region 22B as excitation light LB. Description will be made assuming that the sample S contained in the measurement-target region 22B is a substance such as a cell labelled by fluorescent colorant that emits fluorescence as a result of projection of the excitation light LB. In this case, the intensity of light emitted from a region PB in which the sample S is present in the region of projection of the excitation light LB in the measurement-target region 22B is higher than the intensity of light emitted from a region PA in which the sample S is not present.

Figure 22B:
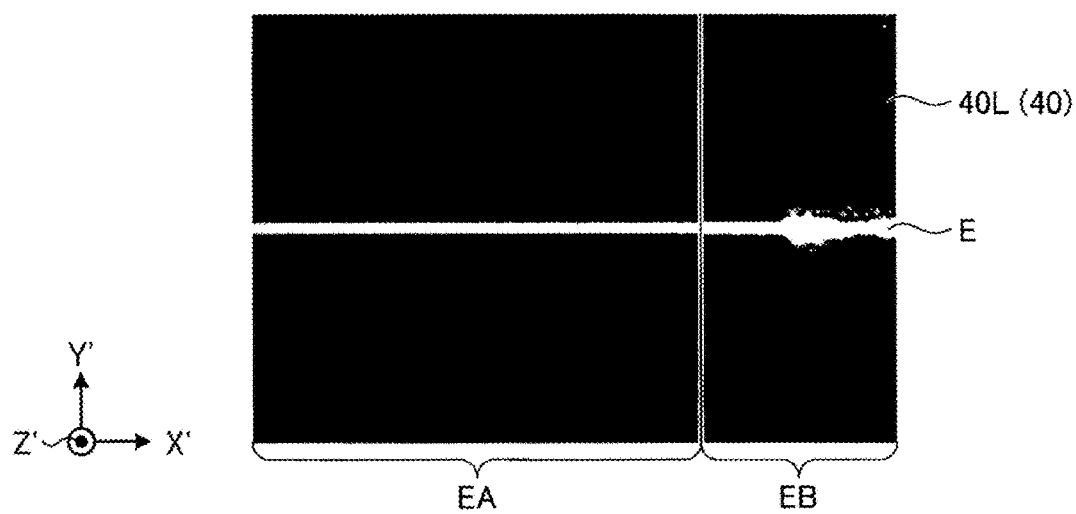
FIG. 22B is a schematic diagram showing an example of a fluorescence signal according to the third embodiment of the present disclosure.

FIG. 22B is a schematic diagram showing an example of a fluorescence signal 40L. The fluorescence signal 40L is an example of the fluorescence signal 40 output from the detection unit 39.

Intensity values of fluorescence received by light-receiving units 31 are lower in a region EA of the fluorescence signal 40L corresponding to the region PA in which the sample S is not present than in a region EB corresponding to the region PB in which the sample S is present. Thus, for the region EA, it is preferable to perform information processing using intensity values of fluorescence received by light-receiving units 31 having high exposure values. Furthermore, for the region EB, it is preferable to perform information processing using intensity values of fluorescence received by light-receiving units 31 having low exposure values.

Thus, the selection unit 19G selects a unitary region 37 including light-receiving units 31 for which a particular exposure value is set from the plurality of types of unitary regions 37 included in the detection unit 39. The selection unit 19G selects a unitary region 37 by using the fluorescence signal 40L acquired by the acquisition unit 19A. Specifically, the selection unit 19G selects a unitary region 37 including light-receiving units 31 whose fluorescence intensity value is within a predetermined range. For example, it is assumed that fluorescence intensity values are represented by grayscale values of 0 to 255. In this case, the selection unit 19G identifies a region having a grayscale value as its fluorescence intensity value within a predetermined range in the fluorescence signal 40L. Then, the selection unit 19G selects a unitary region 37 including light-receiving units 31 corresponding to the identified region. For example, the selection unit 19G selects a unitary region 37 including light-receiving units 31 that output fluorescence intensity values within a range of grayscale values of 10 to 250 as the predetermined range.

Figure 22C:
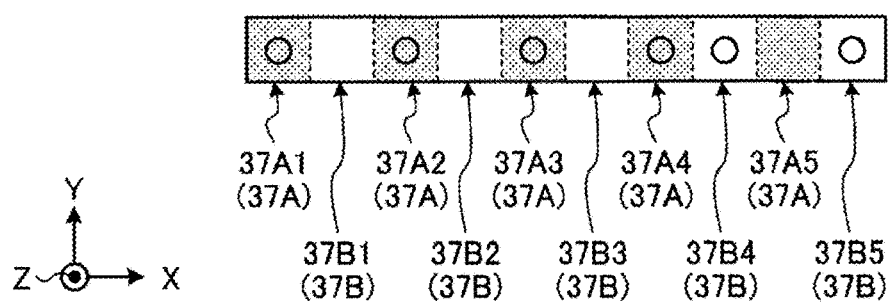
FIG. 22C is an illustrative diagram of selection of a unitary region according to the third embodiment of the present disclosure.

FIG. 22C is an illustrative diagram of selection of unitary regions 37. As a result of the above-described selection processing, the selection unit 19G selects unitary regions 37A (unitary regions 37A1, 37A2, 37A3, 37A4) for which high exposure values are set for the included light-receiving units 31 for the region EA of the fluorescence signal 40L corresponding to the region PA in which the sample S is not present. Furthermore, the selection unit 19G selects unitary regions 37B (unitary regions 37B4, 37B5) for which low exposure values are set for the included light-receiving units 31 for the region EB of the fluorescence signal 40L corresponding to the region PB in which the sample S is present.

Returning to FIG. 21, the description will be continued. As with the generation unit 12D of the first embodiment, the generation unit 19D generates a profile of fluorescence intensity values included in the fluorescence signal 40L. However, the generation unit 19D of the present embodiment generates the profile by using a fluorescence signal 40 including fluorescence intensity values of light-receiving units 31 included in the unitary region 37 selected by the selection unit 19G in the fluorescence signal 40L.

The identification unit 19E identifies the barycentric position of fluorescence intensity values in the fluorescence signal 40L on the basis of the profile generated by the generation unit 19D. That is, the identification unit 19E identifies the barycentric position on the basis of the profile of the fluorescence signal 40 indicating fluorescence intensity values received by the light-receiving units 31 included in the unitary regions 37 (unitary regions 37A1, 37A2, 37A3, 37A4, 37B4, 37B5) selected by the selection unit 19G. The identification unit 19E can calculate the barycentric position in a manner similar to the identification unit 12E of the first embodiment except for using the profile.

The calculation unit 19F identifies a target barycentric position and calculates the above-mentioned movement amount and the above-mentioned movement direction on the basis of the difference between the barycentric position and the target barycentric position in a manner similar to the calculation unit 12F of the first embodiment.

The calculation unit 19F moves at least one of the objective lens 20 or the measurement-target member 22 by the movement amount in the movement direction derived by the derivation unit 19B. The calculation unit 19F moves at least one of the objective lens 20 or the measurement-target member 22 in a manner similar to the movement control unit 12C of the first embodiment except for using the movement amount and the movement direction derived by the derivation unit 19B instead of the derivation unit 12B.

Next, an example of a flow of information processing performed by the focus adjustment device 19 will be described.

Figure 23:
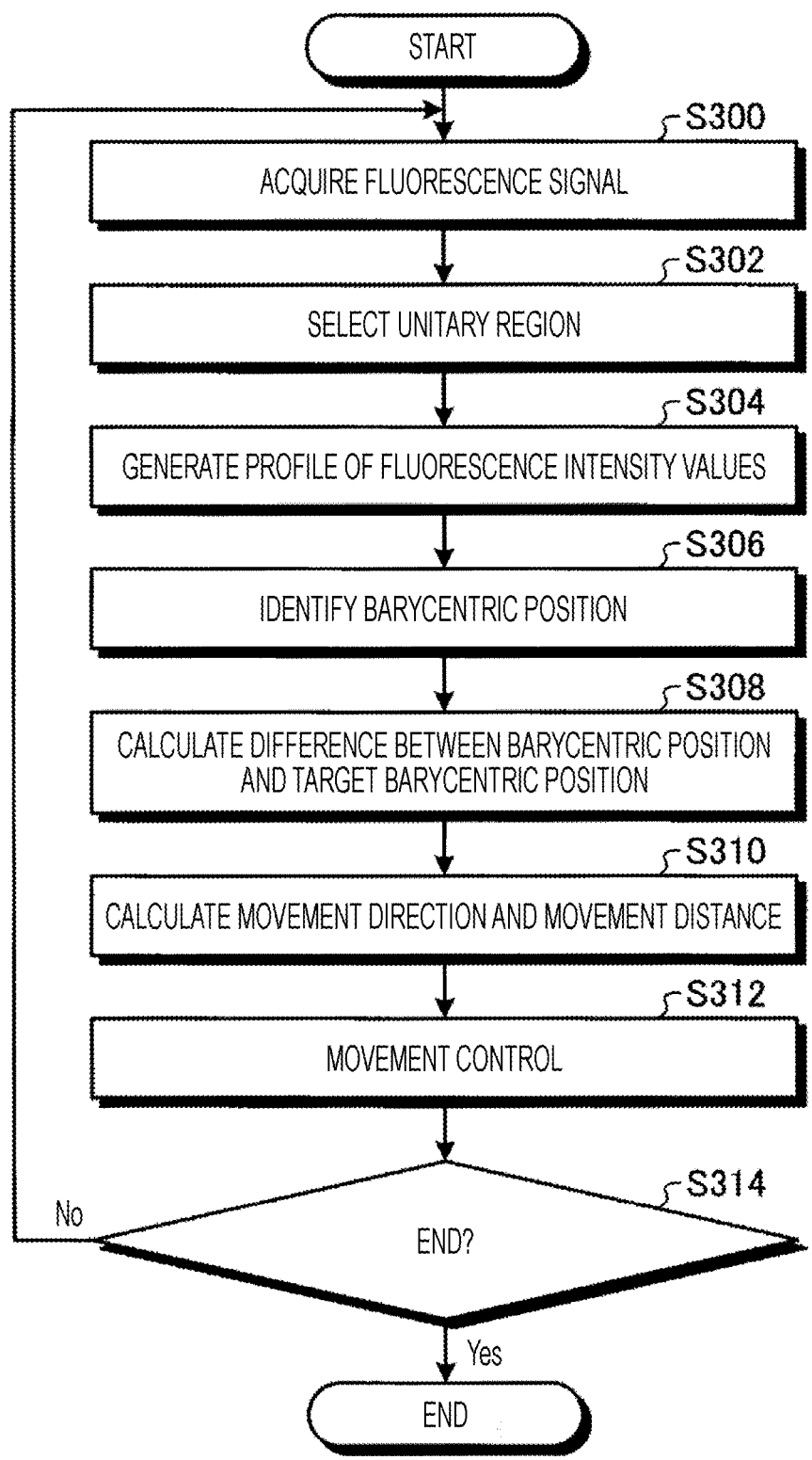
FIG. 23 is a flow chart showing an example of a flow of information processing according to the third embodiment of the present disclosure.

FIG. 23 is a flow chart showing an example of a flow of information processing performed by the focus adjustment device 19.

The acquisition unit 19A acquires a fluorescence signal 40L from the detection unit 39 (step S300).

The selection unit 19G selects a unitary region 37 including light-receiving units 31 for which a particular exposure value is set from a plurality of types of unitary regions 37 (step S302).

The generation unit 19D generates a profile by using a fluorescence signal 40 including fluorescence intensity values of light-receiving units 31 included in the unitary region 37 selected in step S302 in the fluorescence signal 40L acquired in step S300 (step S304).

The identification unit 19E identifies a barycentric position g of fluorescence intensity values in the fluorescence signal 40 on the basis of the profile generated in step S304 (step S306).

Next, the calculation unit 19F calculates the difference, $\Delta g$, between the barycentric position g identified in step S306 and a target barycentric position g' (step S308). Next, the calculation unit 19F calculates a movement amount and a movement direction of at least one of the objective lens 20 or the measurement-target member 22 by using the difference $\Delta g$ calculated in step S308 (step S310).

The movement control unit 19C moves at least one of the objective lens 20 or the measurement-target member 22 by the movement amount in the movement direction derived by the derivation unit 19B (step S312). The movement control unit 19C moves at least one of the objective lens 20 or the measurement-target member 22 by performing driving control of the at least one of the first driving unit 36 or the second driving unit 38. Thus, the positions of the objective lens 20 and the measurement-target member 22 are adjusted such that the objective lens 20 is focused on the measurement-target region 22B of the measurement-target member 22.

Next, the focus adjustment device 19 determines whether or not to end the information processing (step S314). For example, the focus adjustment device 19 makes the determination of step S314 by determining whether or not an instruction signal indicative of ending the processing is received. In a case where it is determined to continue the processing (step S314: No), return to step S300 above. On the other hand, in a case where it is determined to end the processing (step S314: Yes), this routine ends.

As described above, in the detection unit 39 of the microscope system 1E of the present embodiment, a plurality of types of unitary regions 37 in which the included light-receiving units 31 have exposure values different from each other is arrayed along the light-receiving surface. The selection unit 19G of the derivation unit 19B selects a unitary region 37 including light-receiving units 31 having a particular exposure value from the plurality of types of unitary regions 37. The identification unit 19E identifies the barycentric position g on the basis of the profile of the fluorescence signal 40 indicating intensity values of fluorescence of the light-receiving units 31 included in the selected unitary region 37.

Thus, in the microscope system 1E of the present embodiment, it is possible to suppress occurrence of problems such as saturation and lack of signals as compared to a case where the above-described information processing is performed by using a fluorescence signal 40 from a detection unit 30 including light-receiving units 31 for which the same exposure value is set. Furthermore, in the microscope system 1E, it is possible to improve the accuracy of identification of the barycentric position g for identifying the barycentric position g on the basis of the profile of the fluorescence signal 40 indicating the fluorescence intensity values of the light-receiving units 31 included in the selected unitary region 37. Thus, in the microscope system 1E, it is possible to further accurately focus on the measurement-target region 22B arranged across the glass (glass member 22A), in addition to the effects of the above-described embodiment.

Note that, although the embodiments and variations of the present disclosure have been described above, processes in the above-described embodiments and variations may be performed in various different forms than in the above-described embodiments and variations. Furthermore, the above-described embodiments and variations can be combined as appropriate unless the processes contradict.

Furthermore, the effects described herein are merely illustrative but not limitative, and there may also be other effects.

(Hardware Configuration)

Figure 24:
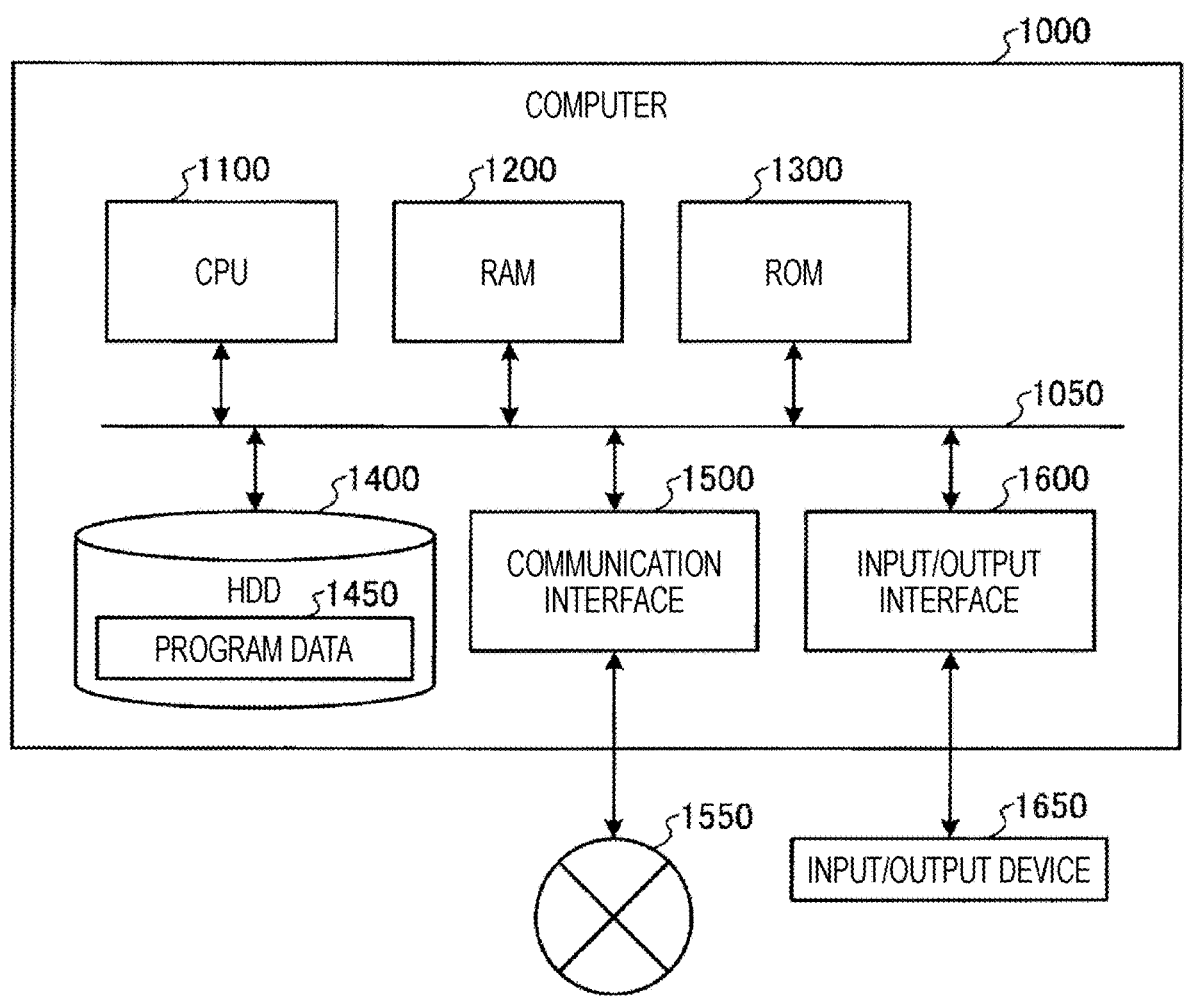
FIG. 24 is a hardware configuration diagram according to the embodiments and variations of the present disclosure.

FIG. 24 is a hardware configuration diagram showing an example of a computer 1000 that realizes the functions of the focus adjustment device 12, the focus adjustment device 13, and the focus adjustment device 19 according to the above-described embodiments and variations.

The computer 1000 includes a CPU 1100, a RAM 1200, a Read Only Memory (ROM) 1300, a Hard Disk Drive (HDD) 1400, a communication interface 1500, and an input/output interface 1600. The portions of the computer 1000 are connected by a bus 1050.

The CPU 1100 operates on the basis of programs stored in the ROM 1300 or HDD 1400 to control the portions. For example, the CPU 1100 loads a focus adjustment program stored in the ROM 1300 or HDD 1400 onto the RAM 1200 and executes processes corresponding to the focus adjustment program.

The ROM 1300 stores a boot program such as a Basic Input Output System (BIOS) executed by the CPU 1100 at the time of starting the computer 1000, a program dependent on hardware of the computer 1000, and the like.

The HDD 1400 is a computer-readable recording medium that non-transitorily records programs executed by the CPU 1100, data used by those programs, and the like. Specifically, the HDD 1400 is a recording medium that records the focus adjustment program according to the present disclosure as an example of program data 1450.

The communication interface 1500 is an interface for the computer 1000 to connect with an external network 1550 (e.g., the Internet). For example, the CPU 1100 receives data from other equipment and sends data generated by the CPU 1100 to other equipment through the communication interface 1500.

The input/output interface 1600 is an interface for connecting input/output devices 1650 and the computer 1000. For example, the CPU 1100 receives data from input devices such as a keyboard and a mouse through the input/output interface 1600. Furthermore, the CPU 1100 sends data to output devices such as a display, a speaker, and a printer through the input/output interface 1600. Furthermore, the input/output interface 1600 may function as a media interface that reads the focus adjustment program or the like recorded on a predetermined recording medium. For example, the medium is an optical recording medium such as a Digital Versatile Disc (DVD) or a Phase change rewritable Disk (PD), a magneto-optical recording medium such as a Magneto-Optical disk (MO), a tapa medium, a magnetic recording medium, a semiconductor memory, or the like.

For example, in a case where the computer 1000 functions as the focus adjustment device 12, the focus adjustment device 13, or the focus adjustment device 19 according to the above-described embodiments, the CPU 1100 of the computer 1000 executes the focus adjustment program loaded on the RAM 1200 to realize the functions of the acquisition unit 12A, the derivation unit 12B, and the movement control unit 12C, or the acquisition unit 13A, the derivation unit 13B, and the movement control unit 13C, or the acquisition unit 19A, the derivation unit 19B, and the movement control unit 19C, and the like. Furthermore, the HDD 1400 stores the focus adjustment program according to the present disclosure and data. Note that, although the CPU 1100 reads the program data 1450 from the HDD 1400 and for execution, it may acquire those programs from another device through the external network 1550 as another example.

Note that the present technology can take the following configurations.

(1)

A microscope system including:

an irradiation unit that projects excitation light having an asymmetric shape with respect to an optical axis;

an objective lens that concentrates the excitation light at a measurement-target member including a glass member and a measurement-target region;

a detection unit that: includes at least one or more light-receiving units that receive fluorescence emitted from the measurement-target region in response to the excitation light; and outputs a fluorescence signal indicating intensity values of fluorescence received by the respective light-receiving units; and a movement control unit that: includes a derivation unit that derives a movement amount and a movement direction of at least one of the objective lens or the measurement-target member on the basis of the fluorescence signal; and moves at least one of the objective lens or the measurement-target member by the derived movement amount in the derived movement direction.

(2)

The microscope system according to (1) above, in which the derivation unit further includes:

a generation unit that generates a profile of the intensity values included in the fluorescence signal;

an identification unit that identifies a barycentric position of the intensity values in the fluorescence signal on the basis of the profile; and a calculation unit that identifies a target barycentric position and calculates the movement amount and the movement direction on the basis of a difference between the barycentric position and the target barycentric position.

(3)

The microscope system according to (2) above, in which in the detection unit, a plurality of types of unitary regions in which exposure values of the light-receiving units included are different from each other are arrayed along a light-receiving surface, and the derivation unit further includes a selection unit that selects a unitary region including a light-receiving unit having a particular exposure value from the plurality of types of unitary regions, and the identification unit identifies the barycentric position on the basis of the profile of the fluorescence signal indicating the intensity value of the light-receiving unit included in the selected unitary region.

(4)

The microscope system according to (2) above, in which the generation unit generates the profile by using the intensity values of a fluorescence-receiving region included in the fluorescence signal.

(5)

The microscope system according to any one of (1) to (4) above, in which the irradiation unit further includes a light-blocking unit that partially blocks irradiation light projected from a light-emitting unit to be output as the excitation light.

(6)

The microscope system according to any one of (1) to (4) above, in which the irradiation unit further includes a separation unit that separates irradiation light projected from a light-emitting unit into an asymmetric shape with respect to an optical axis.

(7)

The microscope system according to any one of (1) to (4) above, in which the irradiation unit further includes a collimating lens that partially collimates irradiation light projected from a light-emitting unit to be output as the excitation light, and the light-emitting unit is configured such that a light-emitting position of the light-emitting unit is arranged at a position deviating from an optical axis of the collimating lens.

(8)

The microscope system according to any one of (1) to (4) above, in which the irradiation unit projects the excitation light which causes astigmatism generated from irradiation light projected from a light-emitting unit.

(9)

The microscope system according to (8) above, in which the derivation unit further includes:

a direction deriving unit that derives the movement direction on the basis of a spread direction of a fluorescence-receiving region included in the fluorescence signal; and a movement amount deriving unit that divides the fluorescence signal into two regions at a straight line passing through the fluorescence-receiving region and along the spread direction of the fluorescence-receiving region as a boundary, and derives, as the movement amount, a ratio of a difference between total values of the intensity values of the two respective regions with respect to a total value of the intensity values included in the fluorescence signal.

(10)

The microscope system according to (8) above, in which the derivation unit divides the fluorescence signal into four regions such that one end portion of a first linear region exhibiting spread of a fluorescence-receiving region when a distance between the objective lens and the measurement-target member decreases, another end portion of the first linear region, one end portion of a second linear region exhibiting spread of the fluorescence-receiving region when the distance between the objective lens and the measurement-target member increases, and another end portion of the second linear region are each arranged in a different region, and further includes:

a direction deriving unit that derives the movement direction according to presence regions that are two of the four regions in which both spread-direction end portions of the fluorescence-receiving region included in the fluorescence signal acquired from the detection unit are located; and a movement amount deriving unit that derives, as the movement amount, a ratio of a difference obtained by subtracting a total value of the intensity values of the two regions other than the presence regions out of the four regions from a total value of the intensity values of the presence regions out of the four regions with respect to a total value of the intensity values included in the fluorescence signal.

(11)

The microscope system according to any one of (1) to (10) above, in which the detection unit is formed by arraying a plurality of block regions along a light-receiving surface, each block region including a plurality of types of the light-receiving units that are different in at least one of gain and charge accumulation time.

(12)

A focus adjustment program for causing a computer to execute:

a step of acquiring a fluorescence signal from a measurement unit including: an irradiation unit that projects excitation light having an asymmetric shape with respect to an optical axis; an objective lens that concentrates the excitation light at a measurement-target member including a glass member and a measurement-target region; a detection unit that: includes at least one or more light-receiving units that receive fluorescence emitted from the measurement-target region in response to the excitation light; and outputs the fluorescence signal indicating intensity values of fluorescence received by the respective light-receiving units; and a step of including a derivation unit that derives a movement amount and a movement direction of at least one of the objective lens or the measurement-target member on the basis of the fluorescence signal and controlling movement of at least one of the objective lens or the measurement-target member by the derived movement amount in the derived movement direction.

(13)

A focus adjustment system configured to include a measurement unit and software used to control operation of the measurement unit, in which the software is provided to an information processing device, the measurement unit includes:

an irradiation unit that projects excitation light having an asymmetric shape with respect to an optical axis;

an objective lens that concentrates the excitation light at a measurement-target member including a glass member and a measurement-target region; and a detection unit that: includes at least one or more light-receiving units that receive fluorescence emitted from the measurement-target region in response to the excitation light; and outputs a fluorescence signal indicating intensity values of fluorescence received by the respective light-receiving units, and the software performs:

acquiring the fluorescence signal from the detection unit;

deriving a movement amount and a movement direction of at least one of the objective lens or the measurement-target member for focusing the objective lens on the measurement-target region on the basis of the fluorescence signal; and controlling movement of at least one of the objective lens or the measurement-target member by the derived movement amount in the derived movement direction.

REFERENCE SIGNS LIST 1, 1A, 1B, 1C, 1D, 1E Microscope system
10, 10A, 10B, 10C Measurement unit
12, 13, 19 Focus adjustment device
12A, 13A, 19A Acquisition unit
12B, 13B, 19B Derivation unit
12C, 13C, 19C Movement control unit
12D, 19D Generation unit
12E, 19E Identification unit
12F, 19F Calculation unit
13D Direction deriving unit
13E Movement amount deriving unit
14, 15A, 15B Irradiation unit
19G Selection unit
20 Objective lens
22 Measurement-target member
22A Glass member
22B Measurement-target region
30, 35, 39 Detection unit

The invention claimed is:

1. A microscope system comprising:
an irradiation device that projects excitation light having an asymmetric shape with respect to an optical axis;
an objective lens that concentrates the excitation light at a measurement-target member comprising a glass member and a measurement-target region;
a detection device that: comprises at least one or more light-receiving elements that receive fluorescence emitted from the measurement-target region in response to the excitation light; and outputs a fluorescence signal indicating intensity values of fluorescence received by the respective light-receiving elements; and
a movement control device that: comprises processing circuitry configured to derive a movement amount and a movement direction of at least one of the objective lens or the measurement-target member on a basis of the fluorescence signal; and controls movement of at least one of the objective lens or the measurement-target member by the derived movement amount in the derived movement direction, wherein deriving further comprises:
generating a profile of the intensity values included in the fluorescence signal;
identifying a barycentric position of the intensity values in the fluorescence signal on a basis of the profile; and
identifying a target barycentric position and calculating the movement amount and the movement direction on a basis of a difference between the barycentric position and the target barycentric position.

2. The microscope system according to claim 1, wherein
in the detection device, a plurality of types of unitary regions in which exposure values of the light-receiving elements included are different from each other are arrayed along a light-receiving surface, and
the processing circuitry is configured to:
select a unitary region including a light-receiving element having a particular exposure value from the plurality of types of unitary regions, and
identify the barycentric position on a basis of the profile of the fluorescence signal indicating the intensity value of the light-receiving unit included in the selected unitary region.

3. The microscope system according to claim 1, wherein the processing circuitry is configured to generate the profile by using the intensity values of a fluorescence-receiving region included in the fluorescence signal.

4. The microscope system according to claim 1, wherein the irradiation device further comprises a light-blocking device that partially blocks irradiation light projected from a light-emitting element to be output as the excitation light.

5. The microscope system according to claim 1, wherein the irradiation device further comprises a collimating lens that partially collimates irradiation light projected from a light-emitting element to be output as the excitation light, and
the light-emitting element is configured such that a light-emitting position of the light-emitting element is arranged at a position deviating from an optical axis of the collimating lens.

6. A microscope system comprising:
an irradiation device that projects excitation light having an asymmetric shape with respect to an optical axis;
an objective lens that concentrates the excitation light at a measurement-target member comprising a glass member and a measurement-target region;
a detection device that: comprises at least one or more light-receiving elements that receive fluorescence emitted from the measurement-target region in response to the excitation light; and outputs a fluorescence signal indicating intensity values of fluorescence received by the respective light-receiving elements; and
a movement control device that: comprises processing circuitry configured to derive a movement amount and a movement direction of at least one of the objective lens or the measurement-target member on a basis of the fluorescence signal; and controls movement of at least one of the objective lens or the measurement-target member by the derived movement amount in the derived movement direction, wherein
the irradiation device further comprises a separation device that separates irradiation light projected from a light-emitting unit into an asymmetric shape with respect to an optical axis.

7. A microscope system comprising:
an irradiation device that projects excitation light having an asymmetric shape with respect to an optical axis;
an objective lens that concentrates the excitation light at a measurement-target member comprising a glass member and a measurement-target region;
a detection device that: comprises at least one or more light-receiving elements that receive fluorescence emitted from the measurement-target region in response to the excitation light; and outputs a fluorescence signal indicating intensity values of fluorescence received by the respective light-receiving elements; and
a movement control device that: comprises processing circuitry configured to derive a movement amount and a movement direction of at least one of the objective lens or the measurement-target member on a basis of the fluorescence signal; and controls movement of at least one of the objective lens or the measurement-target member by the derived movement amount in the derived movement direction, wherein the irradiation device projects the excitation light having astigmatism.

8. The microscope system according to claim 7, wherein the processing circuitry is configured to:

derive the movement direction on a basis of a spread direction of a fluorescence-receiving region included in the fluorescence signal; and divide the fluorescence signal into two regions at a straight line passing through the fluorescence-receiving region and along the spread direction of the fluorescence-receiving region as a boundary, and to derive, as the movement amount, a ratio of a difference between total values of the intensity values of the two respective regions with respect to a total value of the intensity values included in the fluorescence signal.

9. The microscope system according to claim 7, wherein processing circuitry is configured to divide the fluorescence signal into four regions such that one end portion of a first linear region exhibiting spread of a fluorescence-receiving region when a distance between the objective lens and the measurement-target member decreases, another end portion of the first linear region, one end portion of a second linear region exhibiting spread of the fluorescence-receiving region when the distance between the objective lens and the measurement-target member increases, and another end portion of the second linear region are each arranged in a different region, derive the movement direction according to presence regions that are two of the four regions in which both spread-direction end portions of the fluorescence-receiving region included in the fluorescence signal acquired from the detection unit are located; and derive, as the movement amount, a ratio of a difference obtained by subtracting a total value of the intensity values of the two regions other than the presence regions out of the four regions from a total value of the intensity values of the presence regions out of the four regions with respect to a total value of the intensity values included in the fluorescence signal.

10. A microscope system comprising:

an irradiation device that projects excitation light having an asymmetric shape with respect to an optical axis;

an objective lens that concentrates the excitation light at a measurement-target member comprising a glass member and a measurement-target region;

a detection device that: comprises at least one or more light-receiving elements that receive fluorescence emitted from the measurement-target region in response to the excitation light; and outputs a fluorescence signal indicating intensity values of fluorescence received by the respective light-receiving elements; and a movement control device that: comprises processing circuitry configured to derive a movement amount and a movement direction of at least one of the objective lens or the measurement-target member on a basis of the fluorescence signal; and controls movement of at least one of the objective lens or the measurement-target member by the derived movement amount in the derived movement direction, wherein the detection device is formed by arraying a plurality of block regions along a light-receiving surface, each block region including a plurality of types of the light-receiving elements that are different in at least one of gain or charge accumulation time.

11. A non-transitory computer readable medium storing instructions that, when executed by processing circuitry, perform a method comprising:

acquiring a fluorescence signal from a measurement apparatus comprising: an irradiation device that projects excitation light having an asymmetric shape with respect to an optical axis; an objective lens that concentrates the excitation light at a measurement-target member comprising a glass member and a measurement-target region; a detection device that: comprises at least one or more light-receiving elements that receive fluorescence emitted from the measurement-target region in response to the excitation light; and outputs the fluorescence signal indicating intensity values of fluorescence received by the respective light-receiving elements; and deriving a movement amount and a movement direction of at least one of the objective lens or the measurement-target member on a basis of the fluorescence signal and controlling movement of at least one of the objective lens or the measurement-target member by the derived movement amount in the derived movement direction, wherein deriving further comprises:

generating a profile of the intensity values included in the fluorescence signal;

identifying a barycentric position of the intensity values in the fluorescence signal on a basis of the profile; and identifying a target barycentric position and calculating the movement amount and the movement direction on a basis of a difference between the barycentric position and the target barycentric position.

12. A focus adjustment method executed by a measurement unit and processing circuitry wherein the measurement unit comprises:

an irradiation device that projects excitation light having an asymmetric shape with respect to an optical axis; an objective lens that concentrates the excitation light at a measurement-target member comprising a glass member and a measurement-target region; and a detection device that: comprises at least one or more light-receiving elements that receive fluorescence emitted from the measurement-target region in response to the excitation light; and outputs a fluorescence signal indicating intensity values of fluorescence received by the respective light-receiving elements, the method comprising:

acquiring the fluorescence signal from the detection device;

deriving a movement amount and a movement direction of at least one of the objective lens or the measurement-target member for focusing the objective lens on the measurement-target region on a basis of the fluorescence signal; and controlling movement of at least one of the objective lens or the measurement-target member by the derived movement amount in the derived movement direction, wherein deriving further comprises:

generating a profile of the intensity values included in the fluorescence signal;

identifying a barycentric position of the intensity values in the fluorescence signal on a basis of the profile; and identifying a target barycentric position and calculating the movement amount and the movement direction on a basis of a difference between the barycentric position and the target barycentric position.

* * * * *